United States Patent [19]

Itonori

[11] Patent Number: 5,708,730

[45] Date of Patent: Jan. 13, 1998

[54] TABLE RECOGNITION APPARATUS

[75] Inventor: Katsuhiko Itonori, Kanagawa, Japan

[73] Assignee: Fuji Xerox Co., Ltd., Tokyo, Japan

[21] Appl. No.: 479,974

[22] Filed: Jun. 7, 1995

Related U.S. Application Data

[62] Division of Ser. No. 138,203, Oct. 20, 1993, abandoned.

[30] Foreign Application Priority Data

Oct. 27, 1992 [JP] Japan .................................. 4-310861

[51] Int. Cl.$^6$ ...................................................... G06K 9/34
[52] U.S. Cl. ........................... 382/177; 395/771; 358/462; 382/294
[58] Field of Search .............................. 382/176, 177, 382/178, 173, 174, 175, 179, 180, 294, 295; 358/462, 453; 395/148, 149, 770, 771

[56] References Cited

U.S. PATENT DOCUMENTS

| | | | |
|---|---|---|---|
| 5,093,868 | 3/1992 | Tanaka et al. | 382/177 |
| 5,191,612 | 3/1993 | Katsuyama et al. | 382/171 |
| 5,228,100 | 7/1993 | Takeda et al. | 382/175 |
| 5,420,695 | 5/1995 | Ohta | 358/462 |

FOREIGN PATENT DOCUMENTS

| | | |
|---|---|---|
| 1-129358 | 5/1989 | Japan . |
| 2-61775 | 3/1990 | Japan . |
| 3-264386 | 10/1990 | Japan . |
| 3-142691 | 6/1991 | Japan . |

OTHER PUBLICATIONS

Kojima et al. "Table Recognition for Automated Document Entry Systems" in SPIE vol. 1384 High–Speed Inspection Architectures, Barcoding, and Character Recognition 1990, pp. 285–292.

Primary Examiner—Joseph Mancuso
Assistant Examiner—Larry J. Prikockis
Attorney, Agent, or Firm—Finnegan, Henderson, Farabow, Garrett & Dunner, L.L.P.

[57] ABSTRACT

A table recognition apparatus for recognizing a table image wherein coexist characters and ruled lines. The apparatus comprises a character/ruled line separating part for separating characters from ruled lines in the table image; a character block extracting part for extracting character blocks from the character image separated by the character/ruled line separating part; and a character block extending part for extending the character blocks extracted by the character block extracting part in such a manner that the edges of the character blocks are aligned according to the positional relations between the blocks.

3 Claims, 43 Drawing Sheets

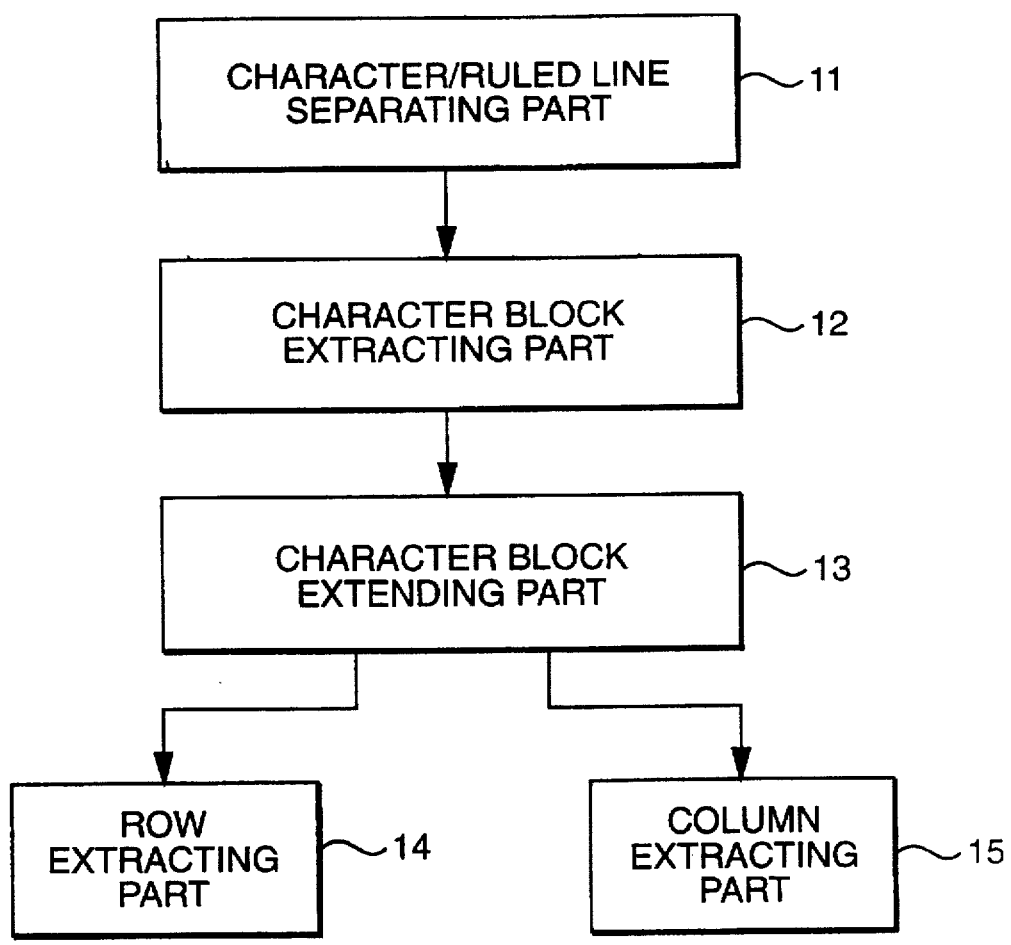
FIG. 1
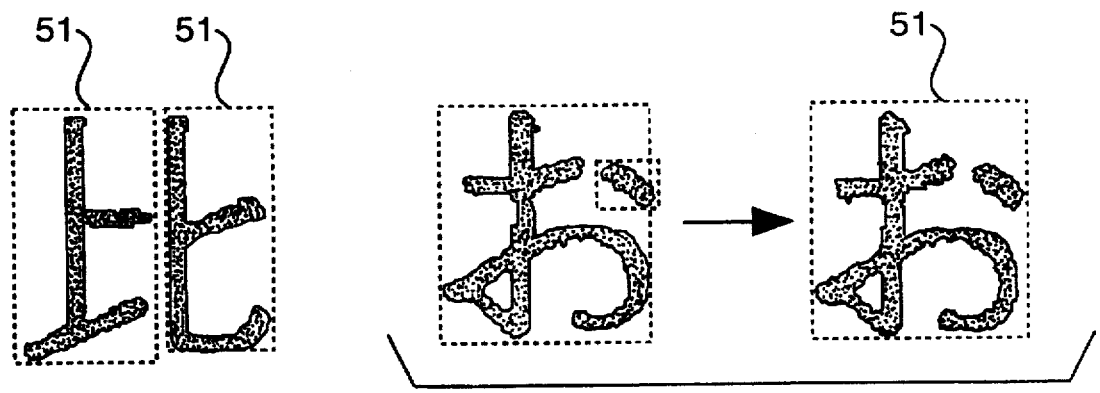
FIG. 3(a)  FIG. 3(b)

| A | B | C | D |
|---|---|---|---|
| e | f | g | h |
| i | j | k | l |

FIG. 2(a)

| A | B | C | D |
|---|---|---|---|
| e | f | g | h |
| i | j | k | l |

FIG. 2(b)

| A | B | C | D |
|---|---|---|---|
| e | f | g | h |
| i | j | k | l |

FIG. 2(c)

| A | B | | C |
|---|---|---|---|
|   | B1 | B2 |   |
| d | e | f | g |
| h | i | j | k |

FIG. 2(d)

| A | B | | C |
|---|---|---|---|
|   | B1 | B2 |   |
| d | e | f | g |
| h | i | j | k |

FIG. 2(e)

| A | BGLP | | C |
|---|---|---|---|
|   | B1 | B2 |   |
| d | e | f | g |
| h | i | j | k |

| YESTERDAY | TODAY | TOMORROW |
|---|---|---|
| FUJI | AKASAKA | ROPPONGI |
| MUSASHI-KOGANEI | SHIBUYA | SHINJUKU |

*FIG. 7(a)*

| YESTERDAY | TODAY | TOMORROW |
|---|---|---|
| FUJI | AKASAKA | ROPPONGI |
| MUSASHI-KOGANEI | SHIBUYA | SHINJUKU |

| A | B | C | D |
|---|---|---|---|
| EF | GH | KL | MN |
| OP | QR | ST | UV |

FIG. 19(a)

| | | | |
|---|---|---|---|
| | | | |
| | | | |

FIG. 19(b)

| FRAME NO. | UPPER RULED LINE | RIGHT-HAND SIDE RULED LINE | LEFT-HAND SIDE RULED LINE | LOWER RULED LINE |
|---|---|---|---|---|
| $W_0$ | V1 | V5,6 | V4 | V13 |
| $W_1$ | V2 | V8 | V5 | V11,12 |
| $W_2$ | V11 | V7 | V6 | V14 |
|  |  |  |  |  |
|  |  |  |  |  |
| $W_{12}$ | V25 | V30 | V29 | V34 |

| A | BGLP | | C |
|---|---|---|---|
| | B1 | B2 | |
| d | e | f | g |
| h | i | j | k |

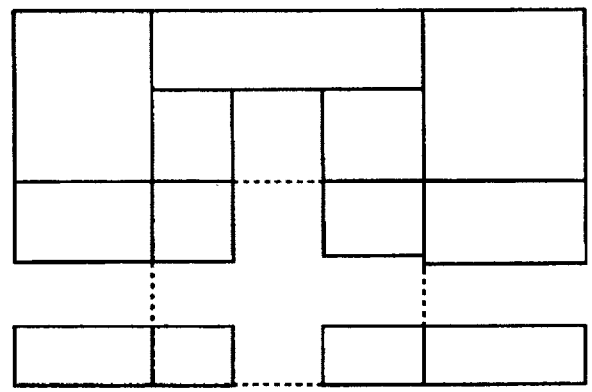
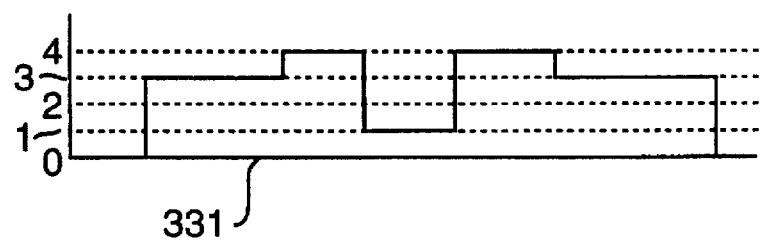
FIG. 34(a)
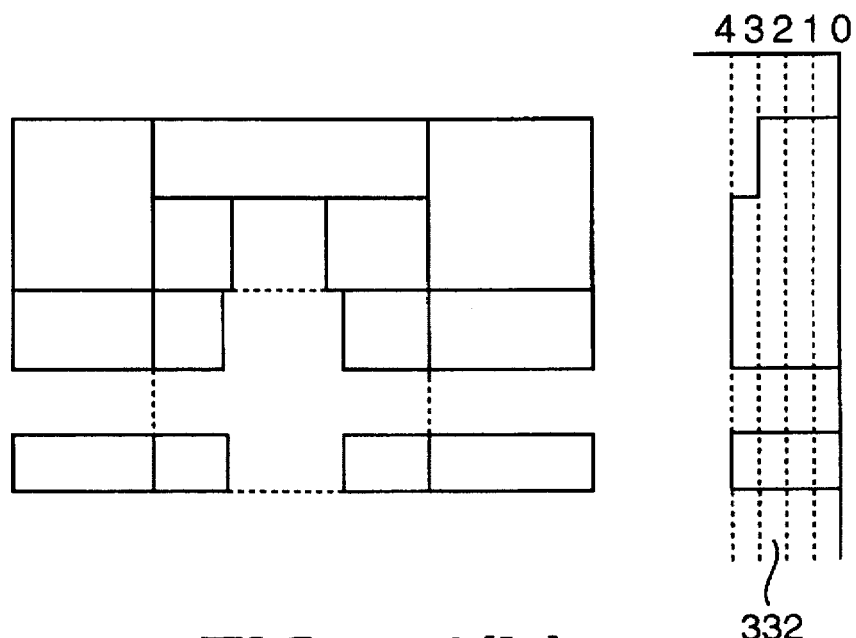
FIG. 34(b)

381

| FRAME NO. | X | W | Y | H |
|---|---|---|---|---|
| $W_0$ | 1 | 1 | 1 | 2 |
| $W_1$ | 2 | 2 | 1 | 1 |
| $W_2$ | 2 | 1 | 2 | 1 |
|  |  |  |  |  |
|  |  |  |  |  |
| $W_{10}$ | 4 | 1 | 3 | 2 |

FIG. 38

| FRAME NO. | X | W | Y | H |
|---|---|---|---|---|
| $W_0$ | 1 | 1 | 1 | 2 |
| $W_1$ | 2 | 2 | 1 | 1 |
| $W_2$ | 2 | 1 | 2 | 1 |
| | | | | |
| $W_{10}$ | 4 | 1 | 4 | 1 |
| $WA_1$ | 4 | 1 | 3 | 1 |
| $WA_2$ | 2 | 1 | 4 | 1 |

FIG. 44(a)

| CONDITION | DIFFUES ILLUTIN | | | | SPOT | | | CONDUCTANCE |
|---|---|---|---|---|---|---|---|---|
| | IPL | SUMI | VITREAL | SIMU | IPL | PNR | WAVE | |
| CONTROL | 246 | 211 | 45 | 15% | 484 | 451 | 407 | 92 |
| CONTROL | 213 | 86% | 34 | 17 | 346 | 378 | 381 | 22% |

FIG. 44(b)

| CONDITION | BIFFUES ILLUTIN | | | | SPOT | | | CONDUCTANCE |
|---|---|---|---|---|---|---|---|---|
| | PL | SUM | VITREAL | SIMU | PL | PNR | WAVE | |
| CONTROL | 246 | 211 | 45 | 15% | 484 | 451 | 407 | 92 |
| CONTROL | 213 | 86% | 34 | 17 | 346 | 378 | 381 | 22% |

TABLE RECOGNITION APPARATUS

This is a division of application Ser. No. 08/138,203, filed Oct. 20, 1993, now abandoned.

BACKGROUND OF THE INVENTION

1. Field of the Invention

The present invention relates to a table recognition apparatus that recognizes an image of a table from a table-character mixture in order to extract a structure of rows and columns from the recognized table image.

2. Description of the Prior Art

Typical prior art table recognition methods involve converting the marginal distribution of a table region or the ruled lines constituting the table into vector segments so as to reconstruct a rectangular frame enclosed by the ruled lines. A typical method of table recognition utilizing marginal distribution is disclosed in Japanese Patent Laid-Open No. HEI/2-61775, and a representative method based on the use of ruled lines converted to vector segments is disclosed in Japanese Patent Laid-Open No. HEI/1-129358. Using marginal distribution, the former method disclosed first extracts the outermost ruled lines of a target table. The table is then divided into a plurality of rectangular frames formed by ruled lines whose ends contact the two outermost ruled lines on both sides. Each of the rectangular frames thus formed is divided repeatedly in like manner until all rectangular frames in the table are recognized. The latter method disclosed examines the positional relations between rectangular frames extracted by tracing the vector segments obtained, so as to recognize the target table.

The precondition for the above two prior art methods to work is that the table should be composed of whole ruled lines, i.e., no part of the ruled lines should be omitted. In this respect, the method disclosed in Japanese Patent Laid-Open No. HEI/2-264386 allows rectangular frames within a table to be recognized even if the two outermost ruled lines on both sides are missing. This method involves initially extracting vertical and horizontal ruled lines from the image of a target table and checking to see if there exist the outermost ruled lines on both sides of the table. If those ruled lines are absent, they are generated virtually.

The preceding prior art method applies to cases where all rules lines are provided or where only the outermost ruled lines on both sides of the table are omitted. That is, the method is applicable to the cases of FIGS. 2(A) and 2(B), but not to the cases of FIGS. 2(C) through 2(E). Meanwhile, Japanese Patent Laid-Open No. HEI/3-142691 discloses yet another method that is applicable to cases such as that in FIG. 2(C). According to this method, the ruled lines omitted between character columns are supplemented on a virtual basis.

However, where the table has rows or lines nested as shown in FIGS. 2(D) and 2(E), it becomes necessary to examine the image of the table more closely so as to detect contiguous blank regions. This entails prolonging the processing time. In recognizing the structure of rows and columns making up the table, the above prior art method presupposes a representative point (center point or center of gravity) in each of components constituting the table, and detects the distances between such representative points in the row or column direction so as to extract the rows and lines. Specifically, the distance between any two contiguous points of all representative points involved is checked. If the distance is found to be less than a predetermined threshold value, then a row or column is recognized and extracted.

One disadvantage of this prior art method is that the components of the table, usually character blocks, may not be sufficiently aligned for precise extraction of rows and columns.

Another disadvantage of the prior art is that the primary object thereof is to distinguish character portions so that the characters in the table will be recognized precisely by optical character reader (OCR); recognizing and storing the structure of the table itself is not the object. No matter how much content of the table is omitted, all that is needed from the standpoint of the prior art is for character-filled regions to be specified. In other words, omitted parts of the table structure need not be input to OCR and may thus be ignored. This cannot be the case if the table needs to be recognized and input to word processing apparatuses for further use. For example, if the table structure is constituted by horizontal ruled lines alone as depicted in FIG. 2(E), the omissions make it difficult to extract the row-column construction of the table, and hence to reconstitute precisely the entire structure of the table.

SUMMARY OF THE INVENTION

It is therefore an object of the present invention to overcome the above deficiencies and disadvantages of the prior art and to provide a table recognition apparatus for precisely extracting the structure of a table whose ruled lines are considerably omitted or whose contents are partly missing.

In carrying out the invention and according to one aspect thereof, there is provided a table recognition apparatus for recognizing a table image wherein coexist characters and ruled lines, the table recognition apparatus comprising: character/ruled line separating means for separating characters from ruled lines in the table image; character block extracting means for extracting character blocks from the character image separated by the character/ruled line separating means; and character block extending means for extending the character blocks extracted by the character block extracting means in such a manner that the edges of the character blocks are aligned according to the positional relations between the blocks.

In a preferred structure according to the invention, the table recognition apparatus further comprises row extracting means for extracting rows based on the positional relations between the character blocks extended by the character block extending means, and column extracting means for extracting columns based on the positional relations between the character blocks extended by the character block extending means.

According to another aspect of the invention, there is provided a table recognition apparatus for recognizing a table image wherein coexist characters and ruled lines, the table recognition apparatus comprising: character/ruled line separating means for separating characters from ruled lines in the table image; character block extracting means for extracting character blocks from the character image separated by the character/ruled line separating means; first character block extending means, given the ruled line image separated by the character/ruled line separating means and the character blocks extracted by the character block extracting means, for extending each of the character blocks up to the nearest ruled lines in a way that keeps each extended character block from overlapping with other character blocks; second character block extending means, given the character blocks extended by the first character block extending means, for further extending the extended character blocks in such a manner that the edges of the blocks are aligned; row extracting means for extracting rows based on the positional relations between the character blocks extended by the second character block extending means; and column extracting means for extracting columns based on the positional relations between the character blocks extended by the second character block extending means.

According to a further aspect of the invention, there is provided a table recognition apparatus for recognizing a table image wherein coexist characters and ruled lines, the table recognition apparatus comprising: character/ruled line separating means for separating characters from ruled lines in the table image; character block extracting means for extracting character blocks from the character image separated by the character/ruled line separating means; rectangular frame extracting means for extracting a rectangle composed of ruled lines from the ruled line image separated by the character/ruled line separating means; component frame extracting means for extracting as a component frame a rectangular frame including at most one character block based on the inclusive relations between the rectangle extracted by the rectangular frame extracting means and each of the character blocks extracted by the character block extracting means; first character block extending means, given character blocks not included in the component frame extracted by the component frame extracting means and the ruled line image separated by the character/ruled line separating means, for extending a target character block up to the nearest ruled lines in a way that keeps the target character block from overlapping with other character blocks; second character block extending means, given the character blocks extended by the first character block extending means, for further extending the extended character blocks in such a manner that the edges of the blocks are aligned; row extracting means for extracting rows based on the positional relations between the character blocks extended by the second character block extending means and the component frame extracted by the component frame extracting means; and column extracting means for extracting columns based on the positional relations between the character blocks extended by the second character block extending means and the component frame extracted by the component frame extracting means.

According to an even further object of the invention, there is provided a table recognition apparatus for recognizing a table image wherein coexist characters and ruled lines, the table recognition apparatus comprising: character/ruled line separating means for separating characters from ruled lines in the table image; first character block extending means, given the ruled line image separated by the character/ruled line separating means and the character blocks extracted by the character block extracting means, for extending each of the character blocks up to the nearest ruled lines in a way that keeps each extended character block from overlapping with other character blocks; second character block extending means, given the character blocks extended by the first character block extending means, for further extending the extended character blocks in such a manner that the edges of the blocks are aligned; character block normalizing means for normalizing each character block based on the positional relations between the character blocks extended by the second character block extending means; character block interpolating means for detecting a rectangle wherein overlap the character blocks normalized by the character block normalizing means and for regarding the rectangle as a virtual character block; row extracting means for extracting rows based on the positional relations between the character blocks interpolated by the character block interpolating means; and column extracting means for extracting columns based on the positional relations between the character blocks interpolated by the character block interpolating means.

In one embodiment of the invention, the characters and the ruled lines making up the table image are first separated from one another by the character/ruled line separating means. The character block extracting means then extracts a character block by examining the distance between groups of black picture elements in the character image thus obtained. All character blocks acquired by the character block extracting means are extended by the character block extending means so that the block edges are aligned. That is, the embodiment allows a table to be recognized by extending the character blocks constituting the table and by filling the gaps between the character blocks. Even if a considerable portion of the ruled lines constituting the table is missing, that table is recognized. The table is also recognized if the character blocks therein are appreciably out of alignment with one another.

Preferably, the embodiment further includes the row and column extracting means for extracting a structure of rows and columns by examining the extended character blocks in their row and column directions. This makes it possible to extract the table structure precisely.

In another embodiment of the invention, the ruled line image is first obtained by the character/ruled line separating means. Then each of all character blocks extracted by the character block extracting means is extended up to the nearest ruled lines by the first character block extending means so that each extended character block does not overlap with other character blocks. The character blocks extended by the first character block extending means are further extended by the second character block extending means so that the block edges are aligned. Because the character blocks are extended by use of ruled line data, the structure of the table is extracted with higher accuracy. For example, a precise table structure is obtained even in such cases as that of FIG. 20(A) where character blocks exist across a plurality of divided columns (as in divided column headings). The structure typically obtained is shown in FIG. 20(C).

In a further embodiment of the invention, the rectangular frame extracting means extracts all rectangles composed of ruled lines from the ruled line image separated by the character/ruled line separating means. The component frame extracting means examines the inclusive relations between the character blocks extracted by the character block extracting means and the rectangles acquired by the rectangular frame extracting means. Based on the inclusive relations examined, the component frame extracting means extracts as a component frame a rectangle including at most one character block (i.e., a rectangle containing one character block or a rectangle containing no character block). The character blocks not included in the component frames are extended by the first and the second character block extending means. The row and the column extracting means examine the character blocks thus extended and the component frames obtained by the component frame extracting means in the row and column directions. In so doing, the row and the column extracting means extract a table structure of rows and columns. Because the rectangles formed by the ruled lines in the table are used to recognize the structure thereof, a complicated table structure is extracted precisely.

In a still further embodiment of the invention, the characters and the ruled lines in the table image are separated from one another by the character/ruled line separating means. The character block extracting means extracts a character block by examining the distance between groups of black picture elements in the character image thus obtained. Using the ruled line image acquired by the character/ruled line separating means, the first character block extending means extends each of all character blocks acquired by the character block extracting means up to the nearest ruled lines so that each extended character block does not overlap with other character blocks. All extended character blocks are further extended by the second character block extending means so that the block edges are aligned. The extended character blocks are each normalized in position and size by the character block normalizing means based on the data about the rectangular areas formed by these blocks. The character block interpolating means checks the normalized character blocks for overlap and establishes a virtual character block where blocks overlap. The row and the column extracting means examine the character blocks thus interpolated and extract a table structure of rows and columns therefrom. Because the character blocks are extended to have their edges aligned and because the positions and sizes of the blocks are normalized, a precise table structure is acquired even from the table with omissions in its contents.

Other objects, features and advantages of the present invention will become apparent in the following specification and accompanying drawings.

BRIEF DESCRIPTION OF THE DRAWINGS

FIG. 1 is a view outlining how a first embodiment of the invention is constituted;

FIGS. 2a–e are a set of views depicting typical tables used in describing the invention;

FIGS. 3a–b are a set of views illustrating groups of picture elements constituting characters;

FIGS. 7a–b are another set of views portraying how character blocks are typically extracted by the character block extracting part;

FIG. 14(A) is a view showing how rows are typically extracted;

FIG. 14(B) is a view showing how columns are typically extracted;

FIGS. 19a–b are another set of views portraying how character blocks are typically extended by the first character block extending part;

FIG. 34(A) is a view depicting how character blocks are typically extended horizontally;

FIG. 34(B) is a view portraying how character blocks are typically extended vertically;

FIG. 38 is a view depicting a typical character block normalizing table of the fourth embodiment;

FIG. 44(A) is a view of an original table to which the second embodiment is applied; and FIG. 44(B) is a view of the table obtained as a result of the processing on the original of FIG. 44(A).

DESCRIPTION OF THE PREFERRED EMBODIMENTS

[First Embodiment]

Figure 4:
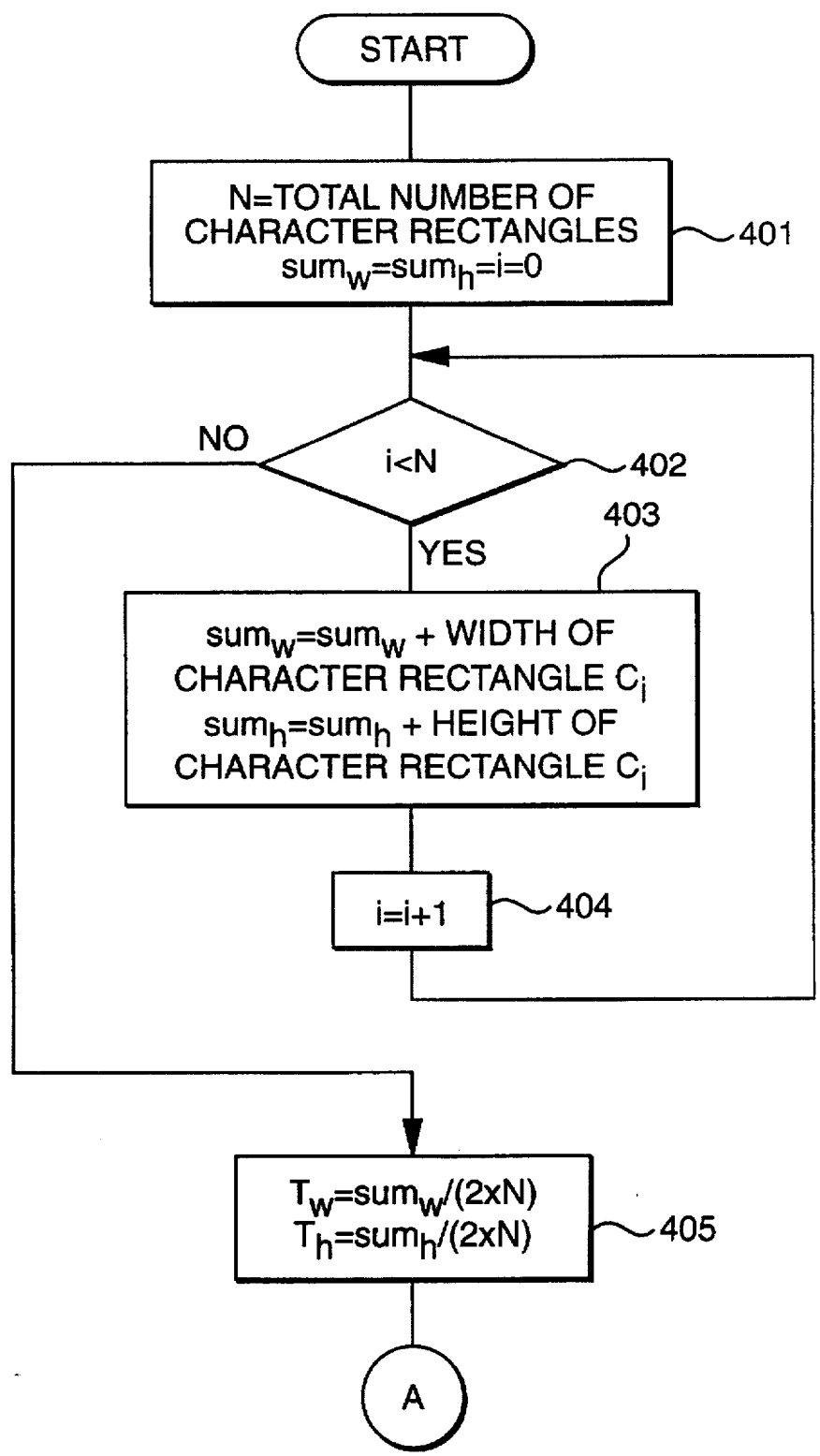
FIG. 4 is a flowchart of steps in which a character block extracting part of the first embodiment works.

FIG. 1 outlines how the first embodiment of the invention is constituted. The first embodiment comprises a character/ruled line separating part 11, a character block extracting part 12, a character block extending part 13, a row extracting part 14 and a column extracting part 15. The character/ruled line separating part 11 separates characters from ruled lines in the table image. The separating process is accomplished by examining the area, contour and complexity of groups of picture elements constituting characters as well as groups of picture elements making up ruled lines (figures). To this process may apply prior art techniques described by Iwaki et al. in "A Study of Introducing a Production System Involving a Character/Figure Separating Process" (PRU 83-62; pp. 67-74). The process is implemented preferably by use of the techniques disclosed by this applicant in Japanese Patent Appl. No. HEI/3-290299. With the separating process completed, it is the character image separated from the table image that needs to be addressed.

From the character image obtained by the character/ruled line separating part 11, the character block extracting part 12 extracts a rectangular area containing one group of picture elements and assumes the area to be a single character. The character block extracting part 12 then integrates into a character block one character or more that are close to one another by judging from the distance therebetween. Each of Japanese characters is often composed of a plurality of groups of picture elements, as shown in FIG. 3. It follows that simply equating one group of picture elements to one character is not correct from a Japanese language point of view. However, since these groups of picture elements when written are located very close to one another as depicted in FIG. 3(A), regarding one picture element group as one character matters little as far as the workings of the first embodiment are concerned. Nevertheless, where two groups of picture elements in their respective rectangular areas overlap with each other, as in FIG. 3(B), the two groups need to be integrated into a new rectangular area. If it is necessary to obtain each character with more precision, the techniques disclosed in Japanese Patent Laid-Open No. HEI/3-267278 may be utilized.

How the character block extracting part 12 works will now be described in detail with reference to the flowcharts of FIGS. 4 and 5. It is assumed that by this time, rectangular areas have been acquired for the groups of picture elements representing all characters in the character image. The rectangular areas are indicated as character rectangles. In FIG. 4, the total sums of the width and height of each character rectangle are obtained (steps 401–404). The total sums of these sizes are averaged and halved for use as threshold values Tw and Th which are referenced when the picture element groups are integrated into a character block. Although the halves of the averaged sizes of the character rectangles are assumed here to be the threshold values, the threshold values may be determined otherwise. For example, predetermined percentages of the averaged distances between character rectangles may be used to determine the threshold values.

Figure 5:
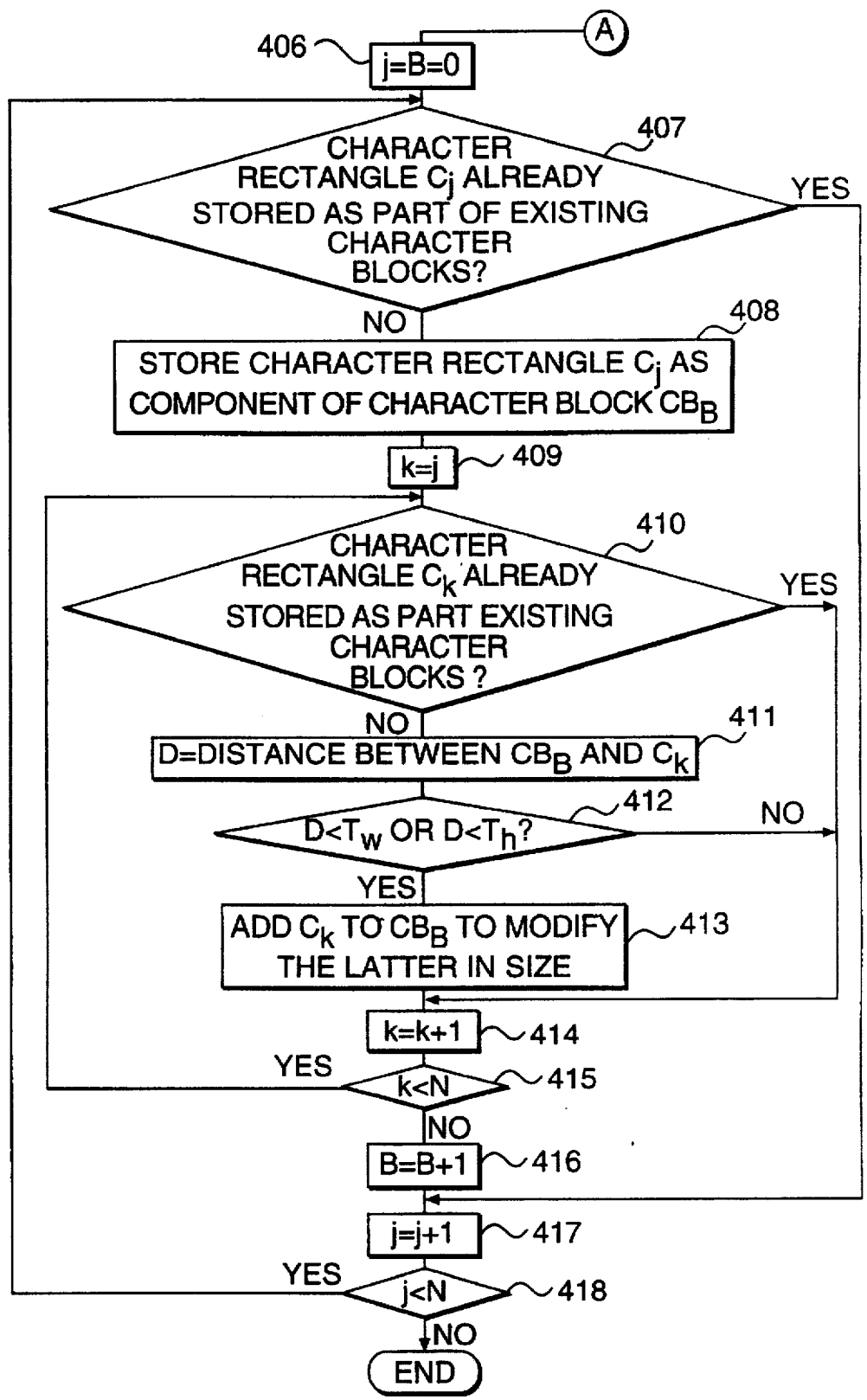
FIG. 5 is a continuation of the flowchart of FIG. 4.

In FIG. 5, character rectangles are taken one at a time, and a check is made to see if a character rectangle is already stored as part of the existing character blocks (step 407). If the character rectangle is not part of the existing character blocks, a new character block is created and the character rectangle is stored as a first component of the new character block (step 408). The remaining character rectangles are each checked for the distances to this new character block (step 411). A check is made to see if the horizontal and vertical distances obtained here are smaller than the threshold values Tw and Th acquired in FIG. 4 (step 412). If the distances are found to be smaller, the current character rectangle is stored as part of the character block (step 413). The above steps are repeated until the character rectangles not found in the existing character blocks have been exhausted.

The steps above extract character blocks as illustrated in FIGS. 6(A), 6(B), 7(A) and 7(B). In this example, only character images are examined and character blocks are extracted therefrom. Alternatively, character blocks are obtained more precisely when the ruled line image acquired by the character/ruled line separating part 1 is referenced so that no matter how close any two picture element groups are located to each other, they are not integrated if there exists a ruled line therebetween.

Figure 8:
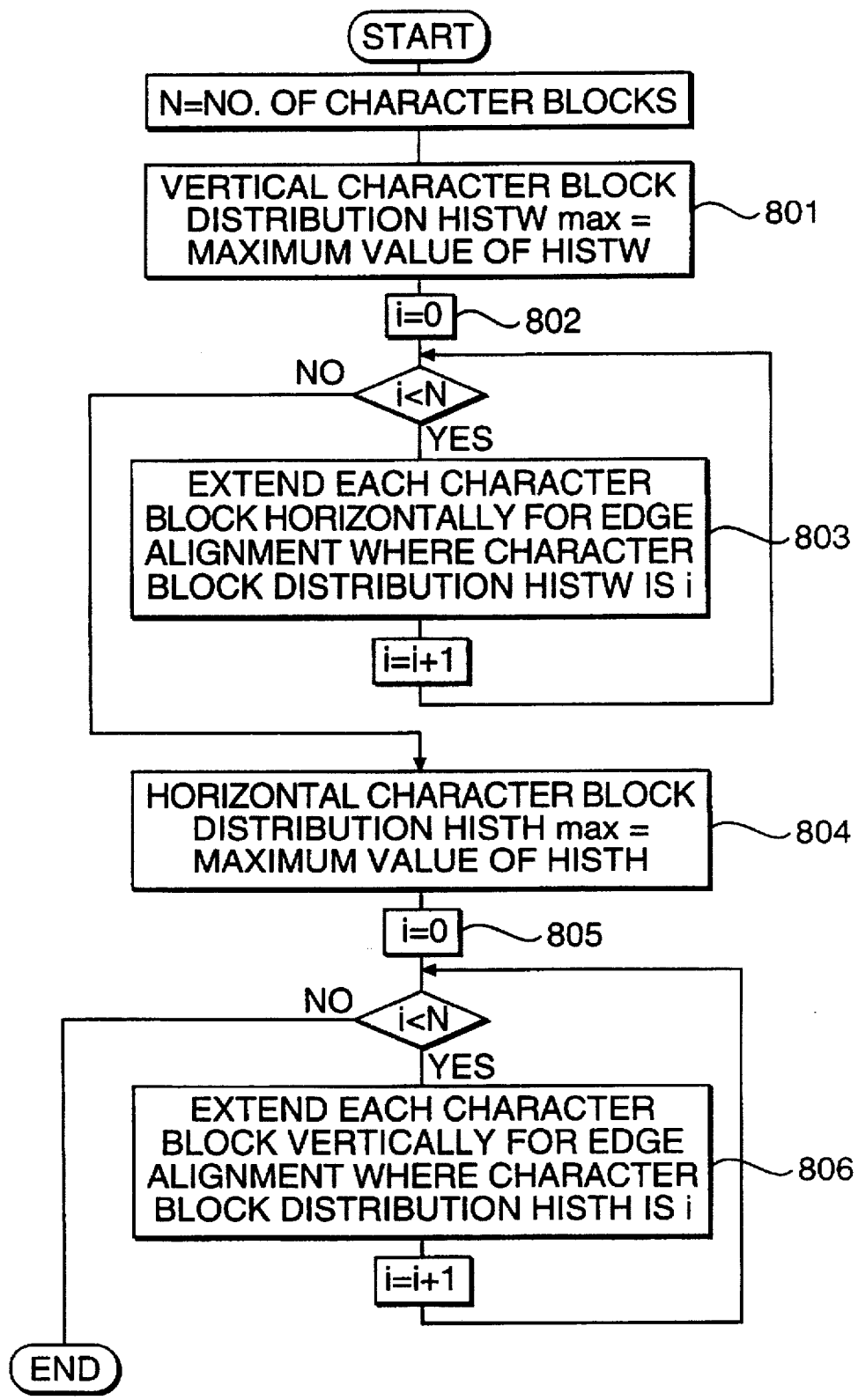
FIG. 8 is a flowchart of steps in which a character block extending part of the first embodiment works.

The character block extending part 13 examines the distribution of character blocks in the vertical and horizontal directions of each character block, and extends the latter block so that the block edges are aligned. How the character block extending part 13 works will now be described with reference to the flowchart of FIG. 8.

Figure 9:
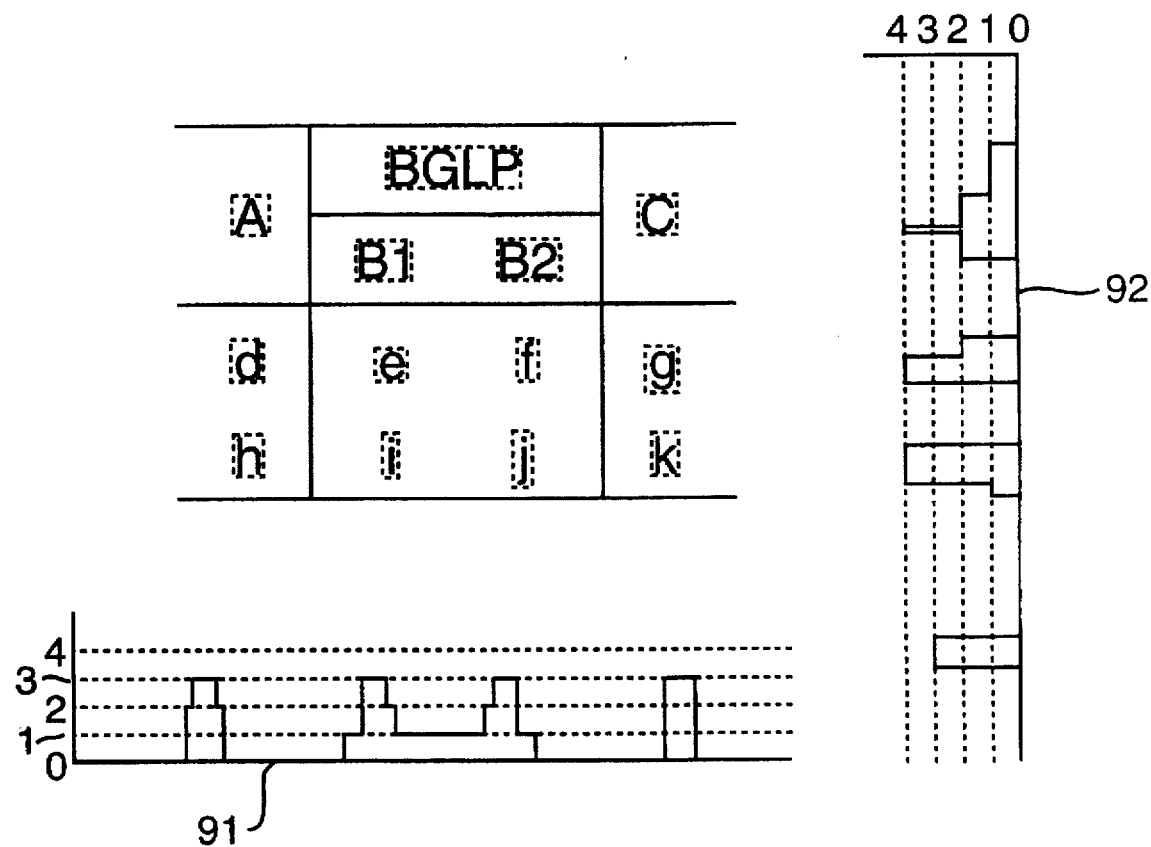
FIG. 9 is a view showing how character blocks are distributed illustratively.

The character block extending process comprises extension in two directions: horizontal and vertical. Initially generated is a vertical character block distribution indicating how many character blocks overlap with one another in which coordinates (step 801). FIG. 9 shows a vertical character block distribution 91 corresponding to the table of FIG. 6(A). FIG. 9 also includes a horizontal character block distribution 92 corresponding to the same table.

A variable i is reset to 0 (step 802). Then portions are found wherein the value of a vertical character block distribution HistW is changed to i, i.e., to 0, or wherein the value is changed from 0 to something greater than 0, so that each character block is extended in terms of width without overlapping with other character blocks (step 803). At this point, the extending process must observe the following two rules:

Rule 1: Extend from left to right if the value is changed to i.

Rule 2: Extend from right to left if the value is changed from i to something greater than i.

Figure 10A:
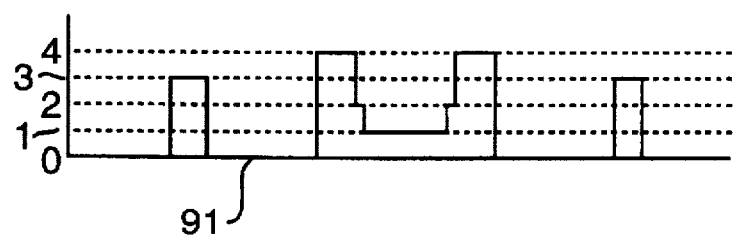
FIGS. 10a–b are a set of views depicting how character blocks are extended horizontally.
Figure 10B:
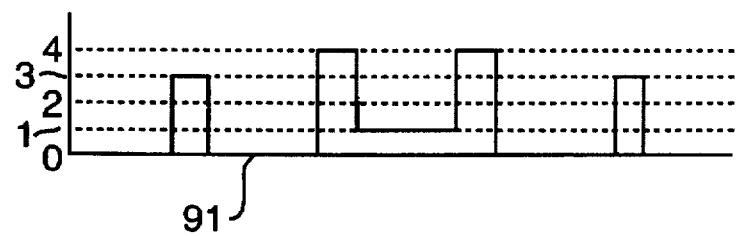

The extending process as constrained above is repeated while i<N. FIG. 10(A) depicts typical results of step 803 given when i=0, and FIG. 10(B) indicates how character blocks look like when their widths have been extended.

Next, a horizontal character block distribution is generated and the heights of the character blocks involved are extended in like manner (steps 804–806). The rules on the extension in step 806 are:

Rule 1: Extend downward when the value is changed to i.

Rule 2: Extend upward when the value is changed from i to something greater than i.

Figure 11:
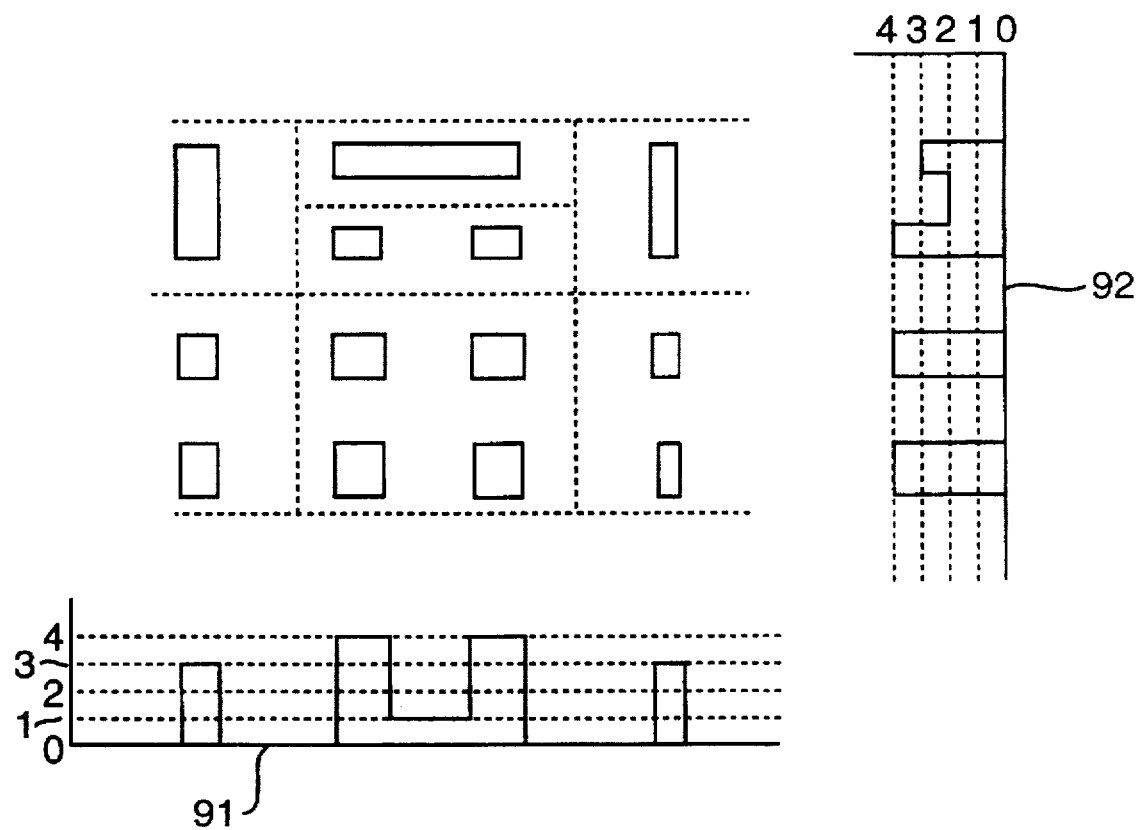
FIG. 11 is a view indicating typical results of character blocks having been extended.
Figure 12:
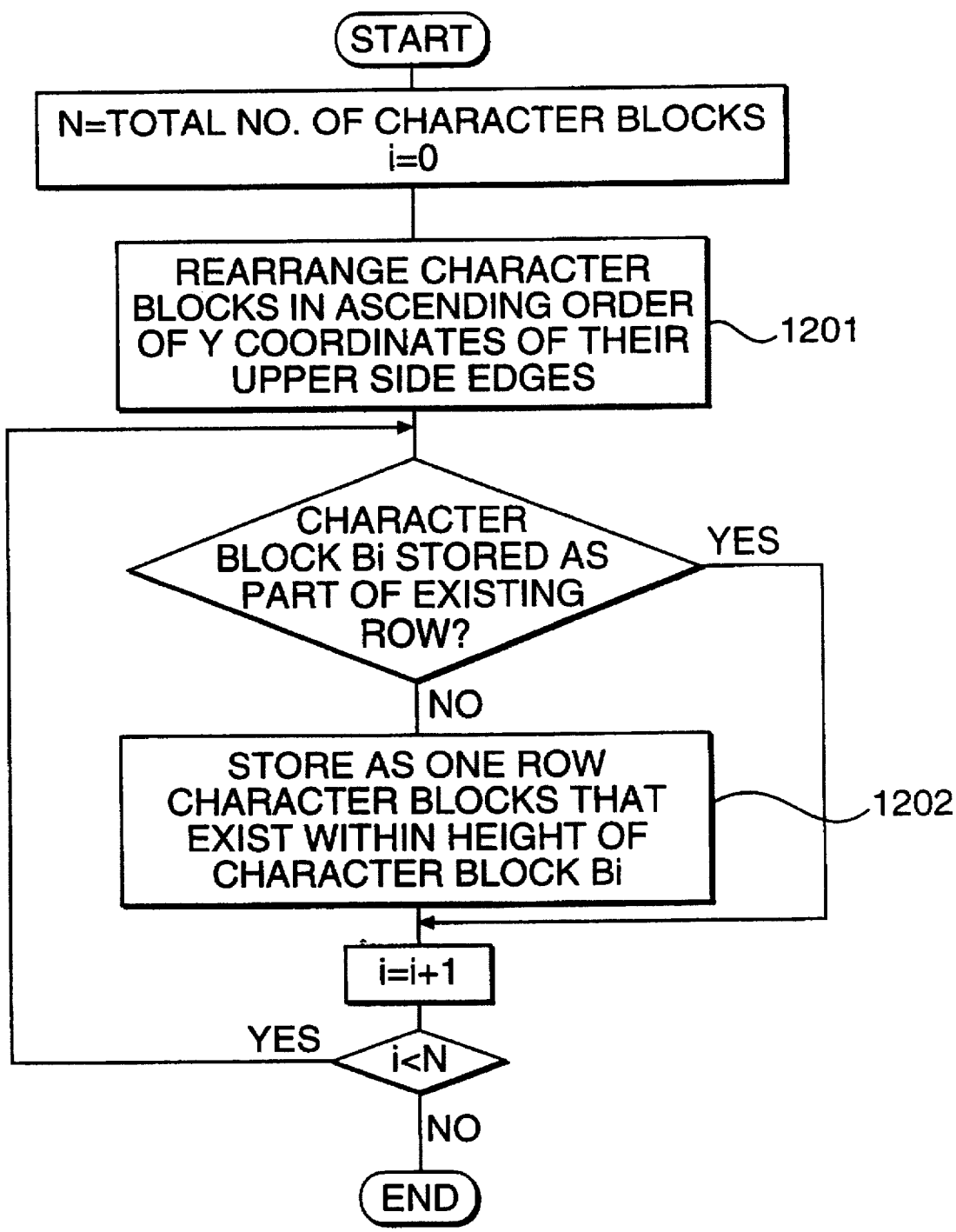
FIG. 12 is a flowchart of steps in which a row extracting part of the first embodiment works.
Figure 13:
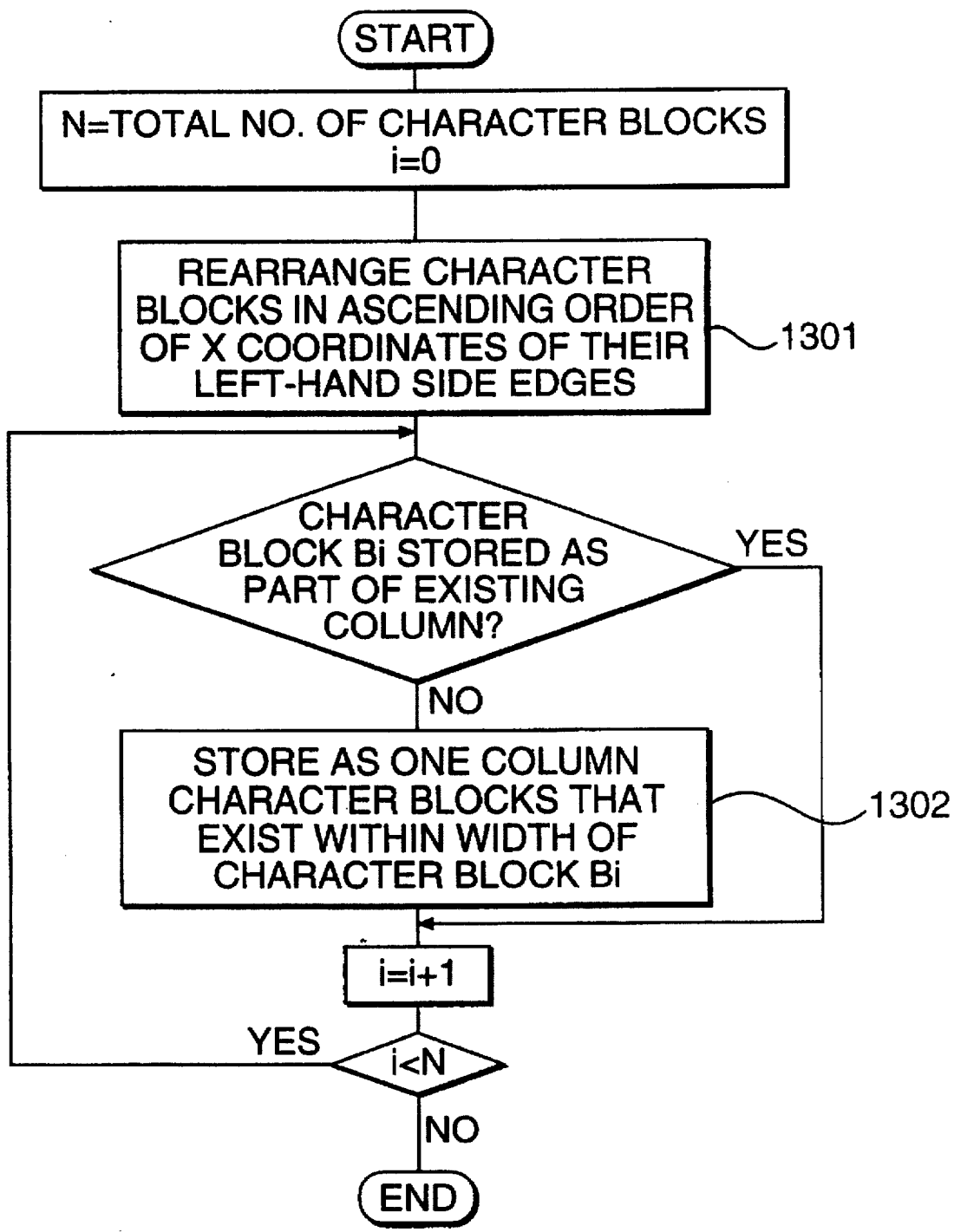
FIG. 13 is a flowchart of steps in which a column extracting part of the first embodiment works.

The processing above provides the character blocks whose edges are aligned in rows and columns, as shown in FIG. 11.

The row extracting part 14 and the column extracting part 15 extract a structure of rows and columns by examining the positional relations between the character blocks extended by the character block extending part 13. As evident from the character block distributions in FIG. 11, the character blocks constituting the rows and columns exist within certain ranges. Thus verifying the inclusive relations between the character blocks makes it possible to extract precisely the rows and columns therefrom. How the row and the column extracting parts 14 and 15 work will now be described with reference to the flowcharts of 12 and 13, respectively.

The row extracting part 14 first rearranges the character blocks in the ascending order of the Y coordinates of their upper side edges (step 1201). Then the i-th character block Bi is taken (i is initially reset to 0). Of the character blocks not yet stored as rows, those that exist within the vertical range in which the character block Bi is located (i.e., the character blocks that exist between the Y coordinates representing the upper and lower side edges of the character block Bi) are considered to form a row and are stored as such (step 1202). This process is repeated until the yet-to-be-stored character blocks have been exhausted.

Likewise, the column extracting part 15 rearranges the character blocks in the ascending order of the X coordinates of their left-hand side edges (step 1301). Then the i-th character block Bi is taken (i is initially reset to 0). Of the character blocks not yet stored as columns, those that exist within the horizontal range in which the character block Bi is located (i.e., the character blocks that exist between the X coordinates representing the left- and right-hand side edges of the character block Bi) are considered to form a column and are stored as such (step 1302). This process is repeated until the yet-to-be-stored character blocks have been exhausted.

Figures 6A, 6B:
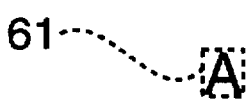
FIGS. 6a–b are a set of views portraying how character blocks are typically extracted by the character block extracting part.
Figures 14A, 14B:
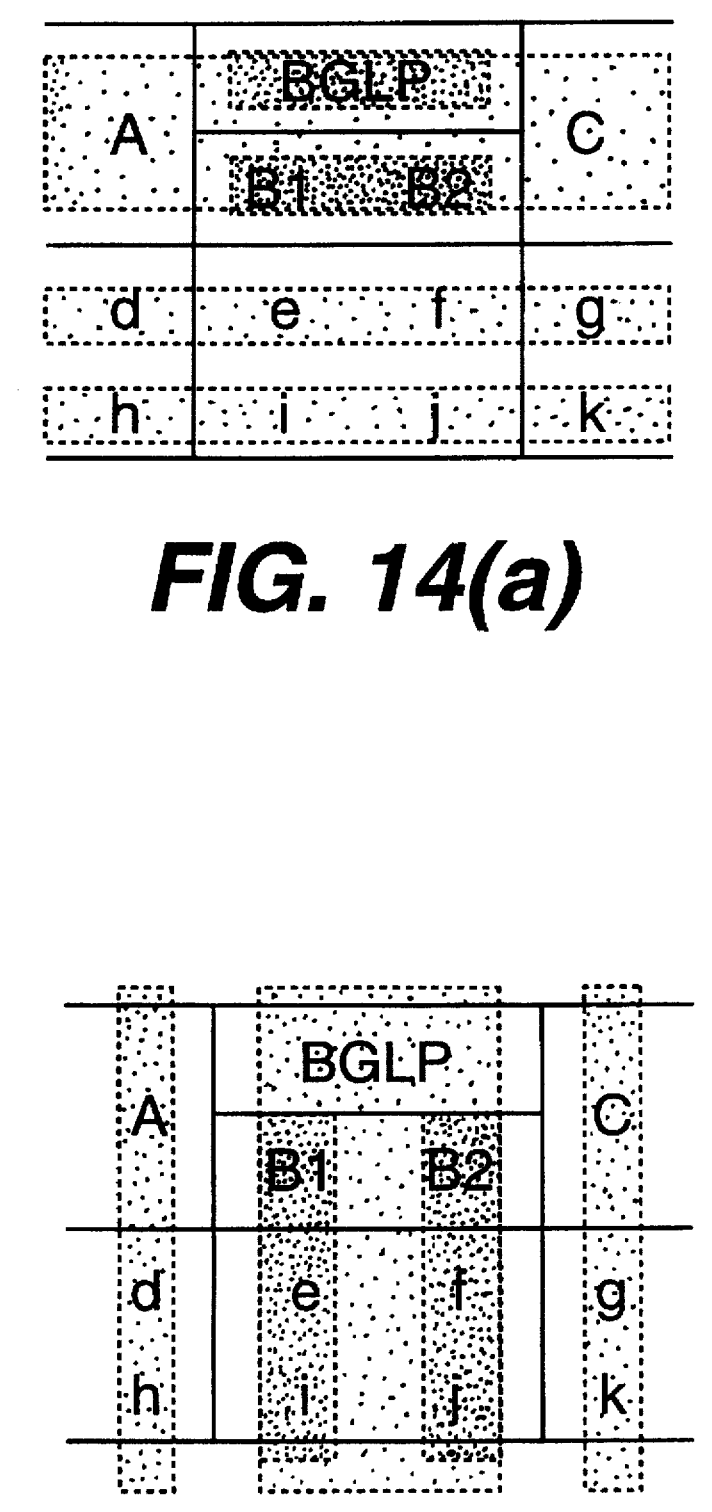

If any row or column is divided as shown in FIG. 6(A), each row and column is subjected to repeated row and column extraction until all segmented rows and columns have been extracted. FIG. 14(A) portrays results of the row extracting operation performed on the table of FIG. 6(A), and FIG. 14(B) illustrates results of the column extracting operation carried out on the same table. When the character blocks are extended to have their edges aligned as described, the structure of the rows and columns constituting the target table is extracted accurately.

[Second Embodiment]

Figure 15:
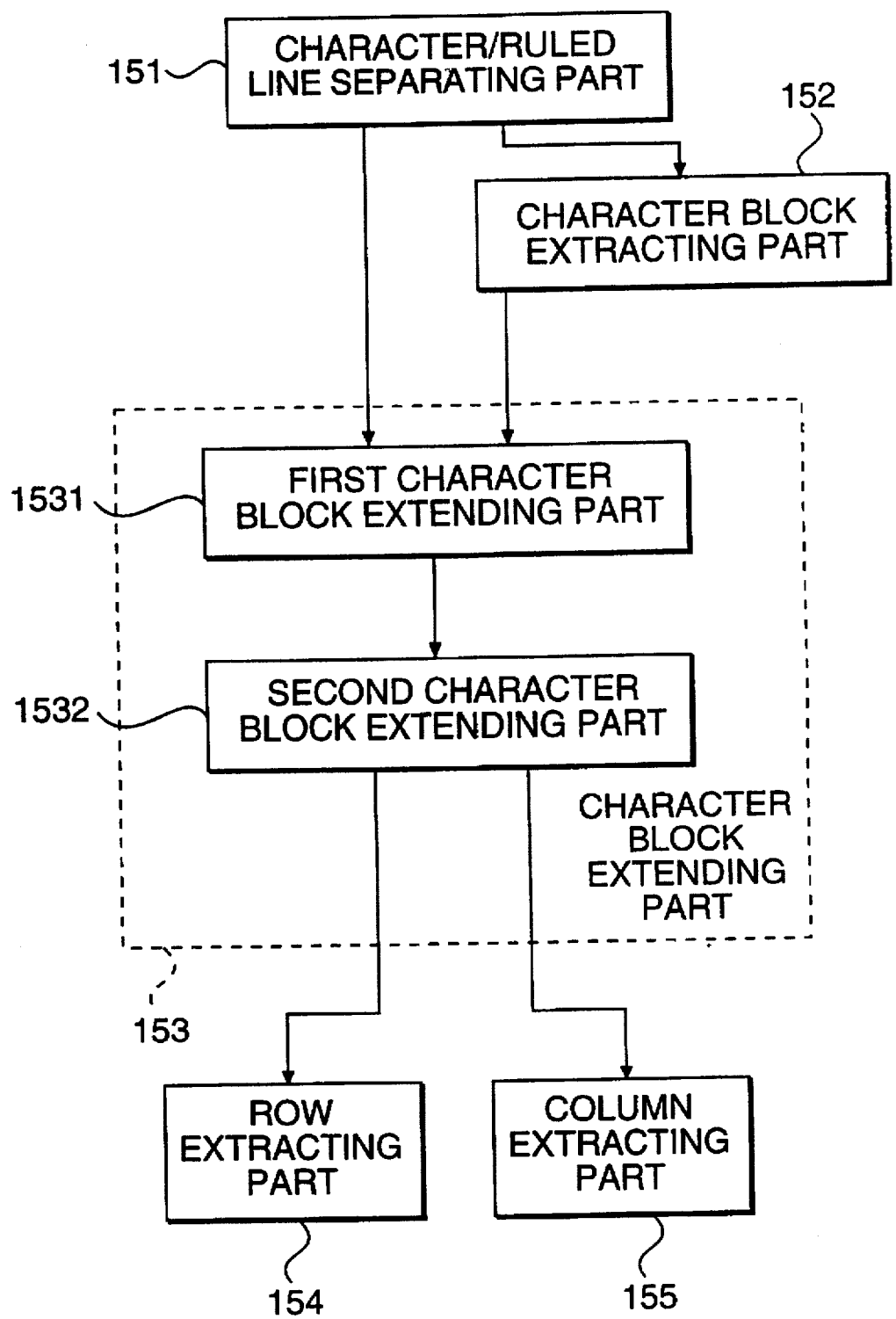
FIG. 15 is a view outlining how a second embodiment of the invention is constituted.

The second embodiment supplements the first embodiment with the capability to simplify the process of extending character blocks using the ruled lines in the table image and to extract the structure of rows and columns more precisely. FIG. 15 outlines how the second embodiment of the invention is constituted. The table recognition apparatus practiced as the second embodiment comprises a character/ruled line separating part 151, a character block extracting part 152, a character block extending part 153, a row extracting part 154 and a column extracting part 155. The character block extending part 153 includes a first character block extending part 1531 and a second character block extending part 1532. The character/ruled line separating part 151 and the character block extracting part 152 are the same as those of the first embodiment and thus will be omitted from the description hereunder.

Figure 16:
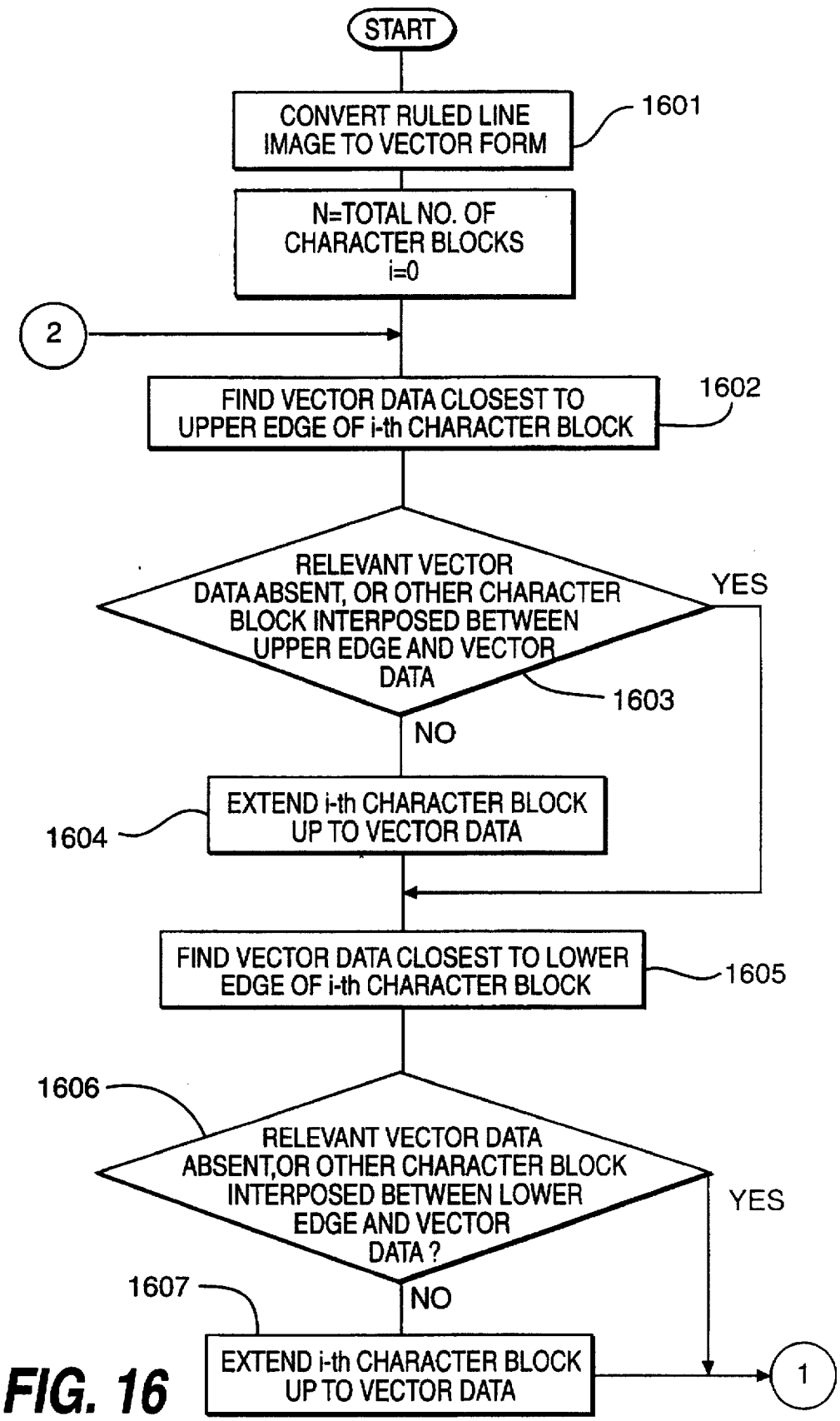
FIG. 16 is a flowchart of steps in which a first character block extending part of the second embodiment works.
Figure 17:
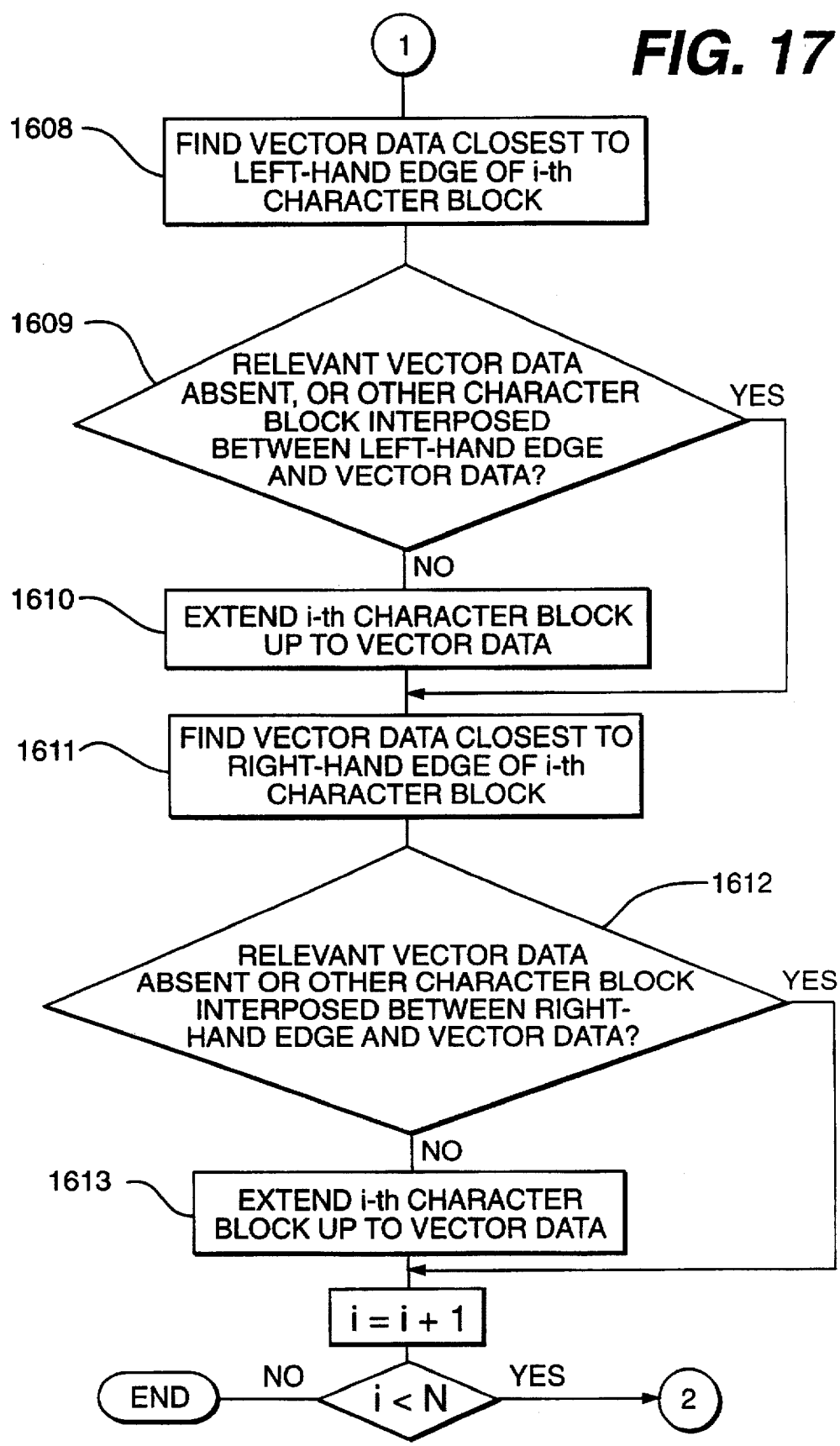
FIG. 17 is a continuation of the flowchart of FIG. 16.

The first character block extending part 1531, given the ruled line image separated by the character/ruled line separating part 151 and the character blocks extracted by the character block extracting part 152, extends the character blocks using the ruled lines. How the first character block extending part 1531 works will now be described with reference to the flowcharts of FIGS. 16 and 17.

The ruled line image is first converted to vectors (step 1601). The techniques for converting the ruled line image to vectors may be those disclosed in Japanese Patent Laid-Open No. HEI/1-142880 or HEI/2-105265. The distance between each character block and the vector data is then obtained, and the data on the vector that is the closest to the upper, lower, left-hand or right-hand side edge of the character block is determined (steps 1602, 1605, 1608 and 1611). If no other character block exists between the closest vector data and the current character block, that character block is extended up to the vector data (steps 1603, 1604, 1606, 1607, 1609, 1610, 1612 and 1613). If possible, the character block is extended in a way that makes the end points of the vector data coincide with the corners of the character block. The steps above are carried out on all character blocks.

Figure 18A:
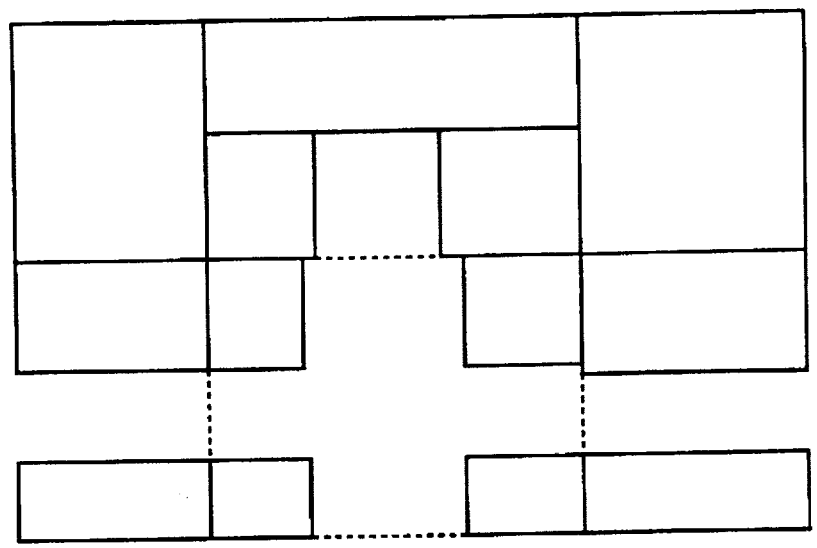
FIGS. 18a–b are a set of views portraying how character blocks are typically extended by the first character block extending part.

FIG. 18(A) shows results of the process performed by the first character block extending part 1531 on the table of FIG. 6(A). FIG. 19 depicts results of the process carried out by the first character block extending part 1531 on a table having all necessary ruled lines. As can be seen from FIG. 19, where the target table has all ruled lines left intact, the character blocks obtained by the first character block extending part 1531 coincide with the rectangles formed by the ruled lines. In such a case, because the edges of the character blocks are already aligned, the processing of the second character block extending part 1532 may be omitted.

Figure 18B:
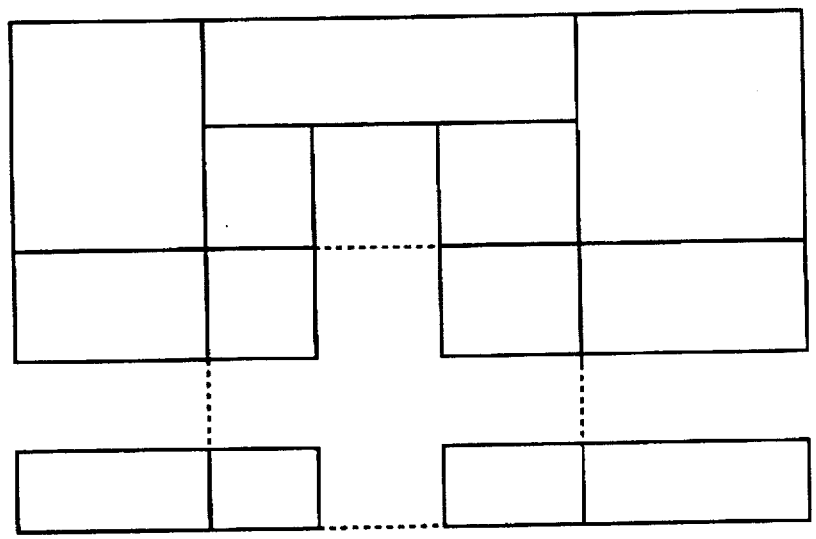

The second character block extending part 1532 operates on the same principle as the character block extending part 13 of the first embodiment. FIG. 18(B) illustrates results of the process performed by the second character block extending part 1532 on the table of FIG. 6(A). The row extracting part 154 and the column extracting part 155 work in the same manner as their counterparts of the first embodiment and thus will not be described hereunder.

Figure 20A:
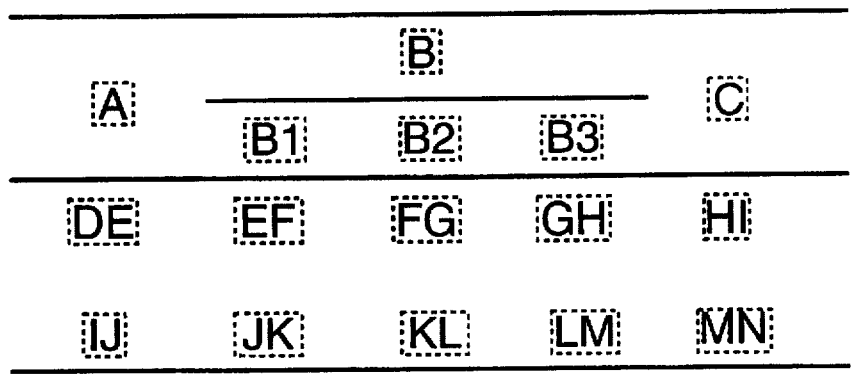
FIGS. 20a–c are a set of views indicating typical results of character block extension in connection with the invention.
Figure 20B:
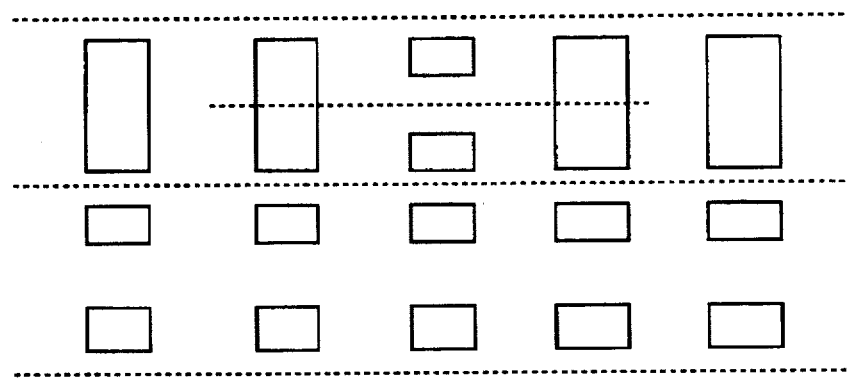
Figure 20C:
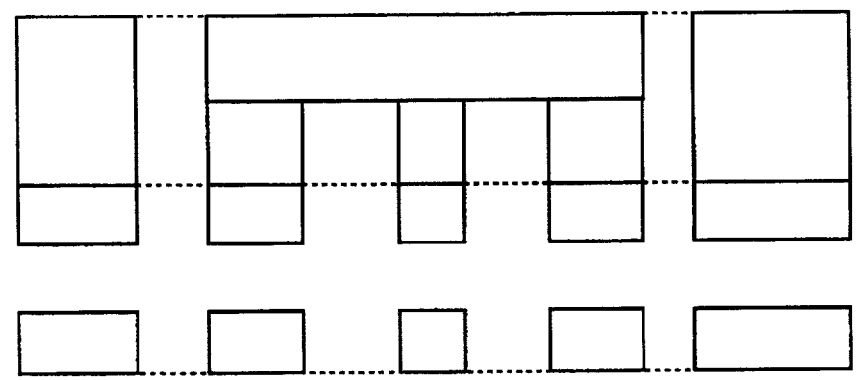

Operating as described, the second embodiment is capable of accurately recognizing tables such as that in FIG. 20(A) of which part of the ruled lines are missing and of which the columns are divided. Although the character block extending part 13 of the first embodiment can only turn the table of FIG. 20(A) incorrectly into results of FIG. 20(B), the first character block extending part 1531 of the second embodiment uses the ruled line data in extending the character blocks in such a manner that the result is a precisely recognized table structure shown in FIG. 20 (c).

[Third Embodiment]

Figure 21:
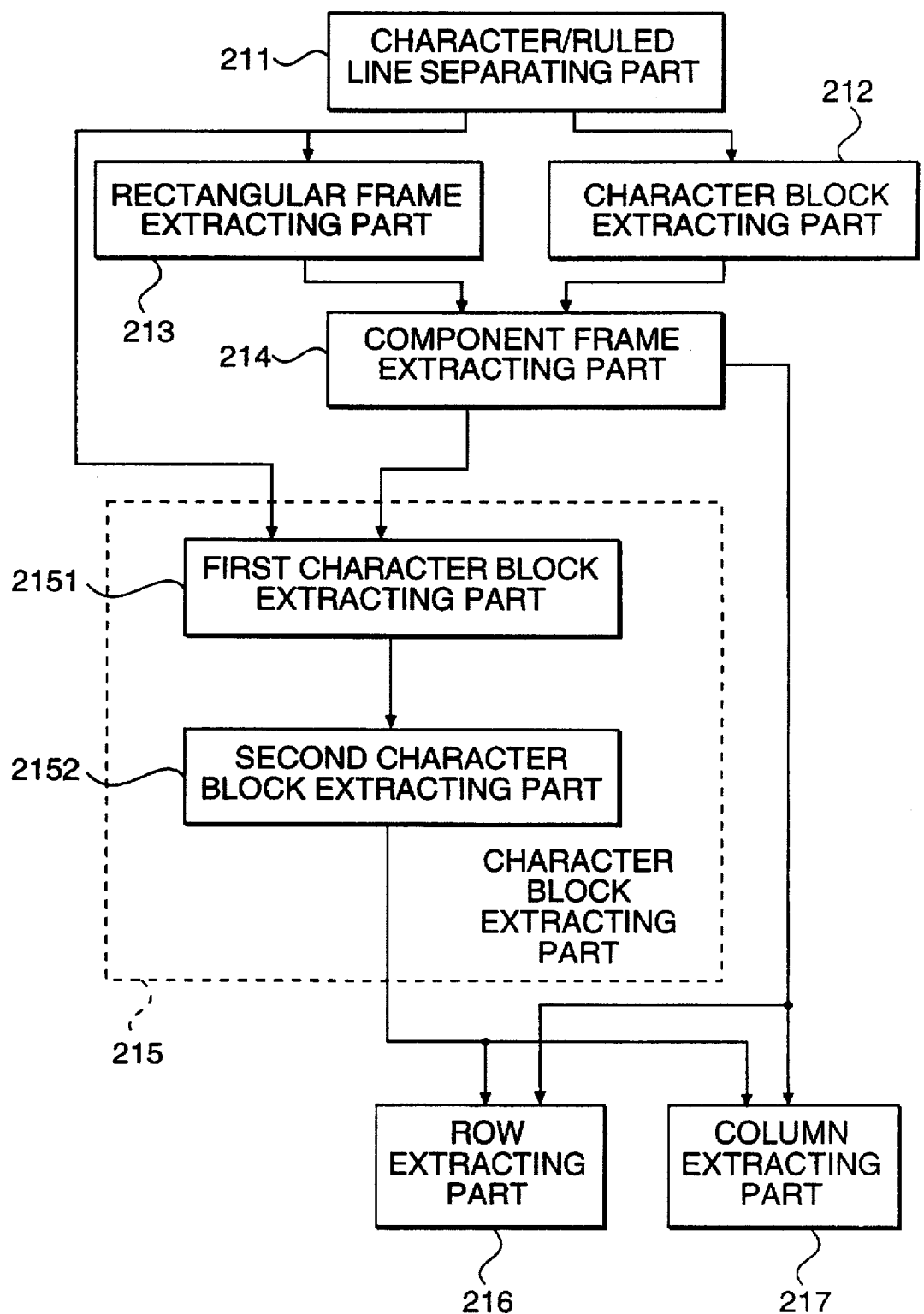
FIG. 21 is a view outlining how a third embodiment of the invention is constituted.

The third embodiment of the invention is designed to extract rows and columns accurately using rectangles derived from the ruled lines in the table image. FIG. 21 outlines how the third embodiment of the invention is constituted. The table recognition apparatus practiced as the third embodiment comprises a character/ruled line separating part 211, a character block extracting part 212, a rectangular frame extracting part 213, a component frame extracting part 214, a character block extending part 215, a row extracting part 216 and a column extracting part 217. The character block extending part 215 includes a first character block extending part 2151 and a second character block extending part 2152.

The input table image is separated by the character/ruled line separating part 211 into the character image and ruled line image. Given the character image as its input, the character block extracting part 212 extracts character blocks therefrom. The character/ruled line separating part 211 and the character block extracting part 212 are the same as those of the first embodiment and thus will be omitted from the description hereunder.

On receiving the ruled line image as its input, the rectangular frame extracting part 213 extracts rectangles made of ruled lines. The extracting process involves turning the ruled line image into vectors and examining the relations between the vector data to extract rectangular frames therefrom. The process of turning ruled lines into vectors is constituted by known techniques (such as those disclosed in Japanese Patent Laid-Open No. HEI/1-142880 or HEI/2-105265) and thus will not be elaborated hereunder. A rectangular frame enclosed by ruled lines is composed of one horizontal vector of which the two ends are connected to two vertical vectors whose ends are again connected to another horizontal vector. Given its structure, each rectangular frame is extracted by examining the horizontal vector data and storing the vectors that meet the conditions required.

Figure 22:
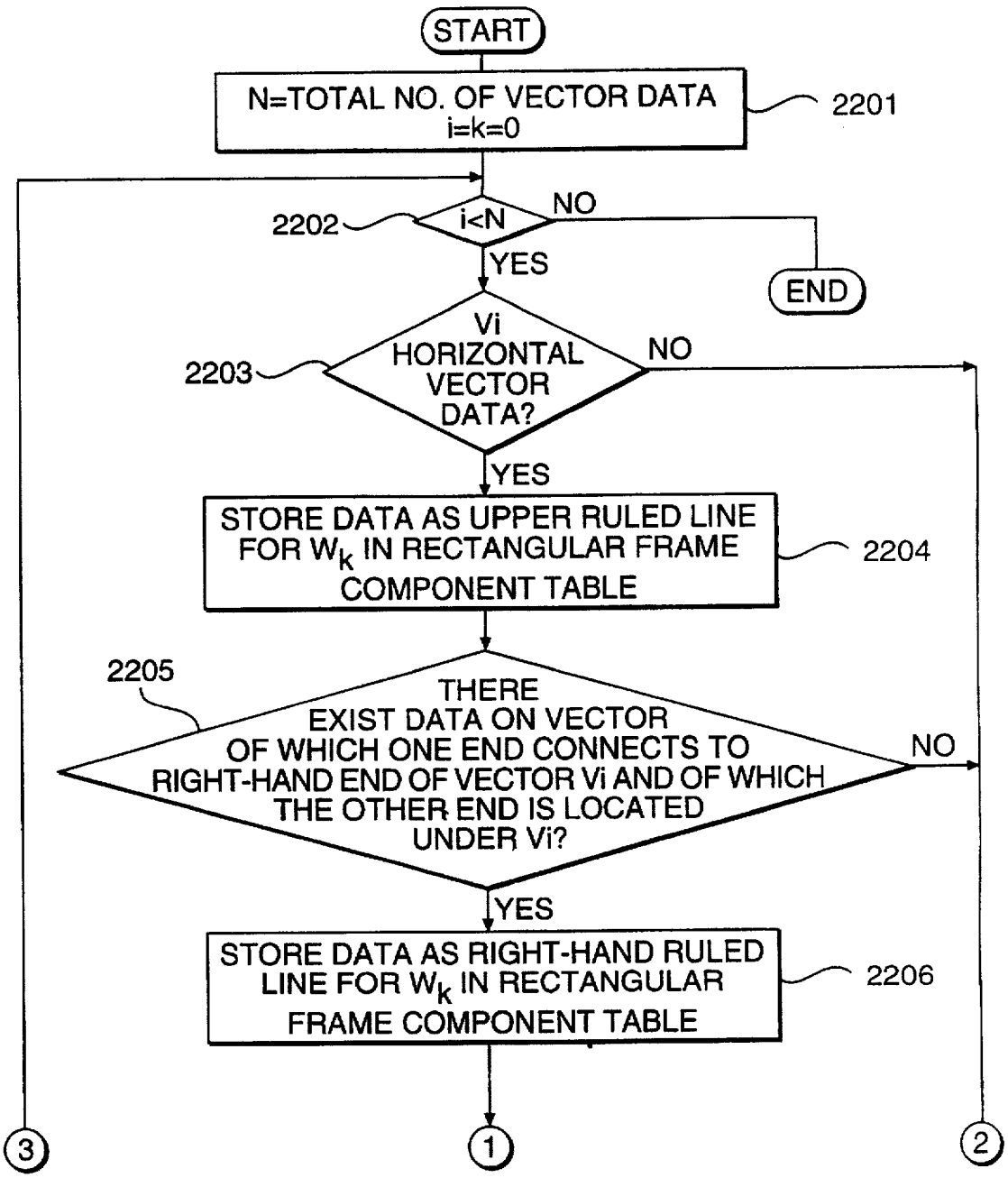
FIG. 22 is a flowchart of steps in which a rectangular frame extracting part of the third embodiment works.
Figure 23:
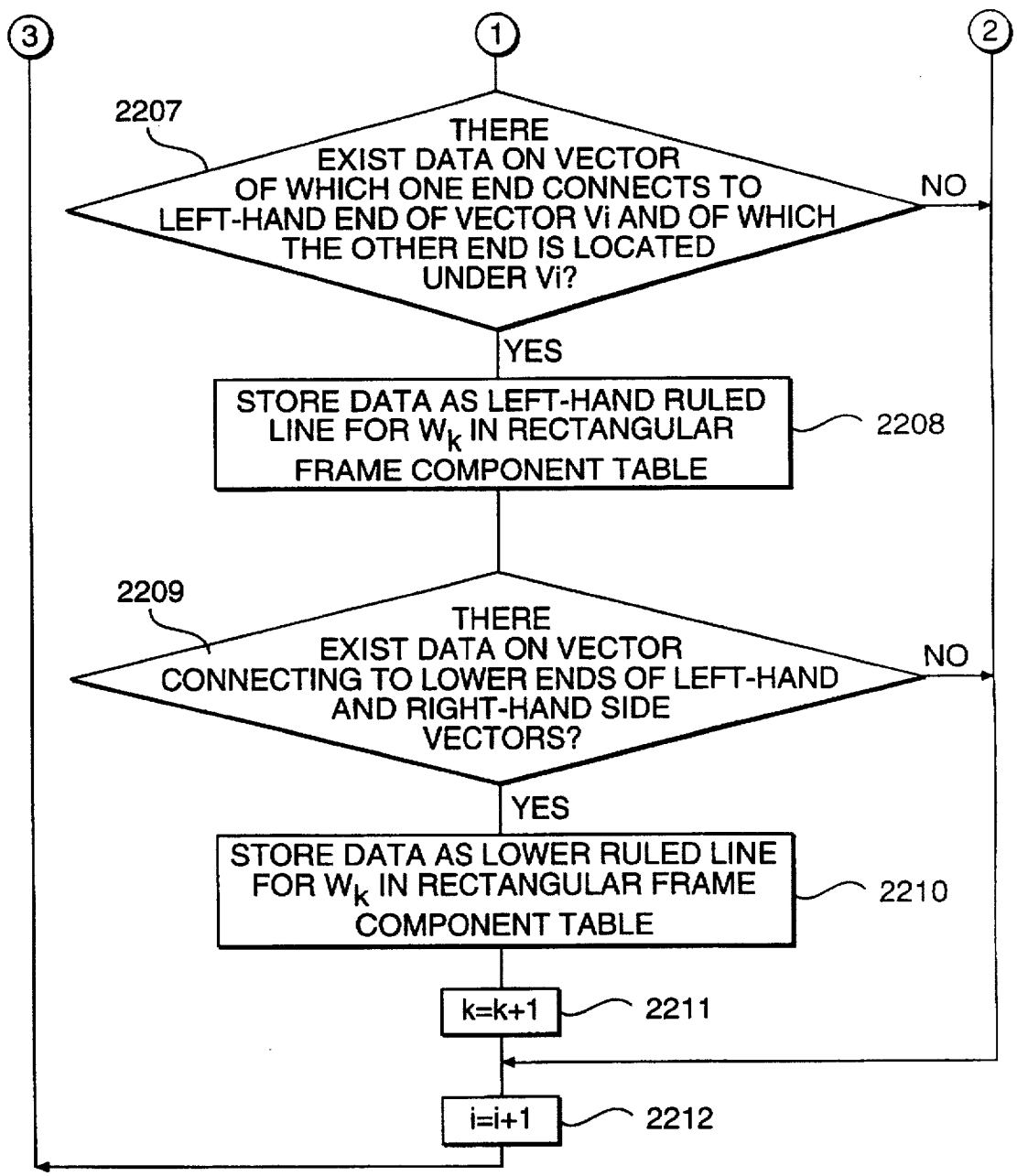
FIG. 23 is a continuation of the flowchart of FIG. 22.

The process of rectangular frame extraction will now be described with reference to the flowcharts of FIGS. 22 and 23. The number of all vectors making up the target table is first counted (step 2201). Steps 2202 through 2212 that follow are applied to all vector data.

The horizontal vector Vi constituting the upper ruled line of the current rectangular frame is searched for and detected (step 2203). A vector is recognized as the horizontal vector Vi if it has an angle less than a threshold value relative to a horizontal line. Because the horizontal vector Vi thus detected can be the upper ruled line of a k-th rectangular frame, the data on the vector Vi is entered into the "Upper Ruled Line" column for the k-th rectangular frame in a rectangular frame component table 241 (step 2204; see FIG. 24).

Next, the vector constituting the right-hand side edge of a rectangular frame Wk is searched for and detected (step 2205). What is sought here is the vector of which one end point contacts the right-hand end of the vector Vi and of which the other end point not in contact with the vector Vi is located under the vector Vi. A vertical vector is easy to find by simply looking for one with an angle less than a threshold value relative to a vertical line. Because the vector found in this step can be the right-hand side ruled line of the rectangular frame Wk, the data on this vector is entered into the "Right-hand Side Ruled Line" column for the k-th rectangular frame 241 in the rectangular frame component table (step 2206). At this point, a check is made to see if there exists a vector which comes under the vector detected as the right-hand side ruled line and which extends leftward from its point of contact with that vector. If there is no such vector, a vertical vector contacting the detected vector can also constitute the right-hand side ruled line of the rectangular frame Wk. Thus the data on the vector underneath is entered into the "Right-hand Side Ruled Line" column for the k-th rectangular frame in the rectangular frame component table 241.

In like manner, the left-hand ruled line of the rectangular frame Wk is searched for and detected (step 2207). The data on the detected vector is entered into the "Left-hand Side Ruled Line" column for the k-th rectangular frame in the rectangular frame component table 241 (step 2208). Furthermore, a horizontal vector connecting the right- and left-hand side ruled lines is searched for and detected (step 2209). The data on the detected horizontal vector is entered into the "Lower Ruled Line" column for the k-th rectangular frame in the rectangular frame component table 241 (step 2210).

Figures 24A, 24B:
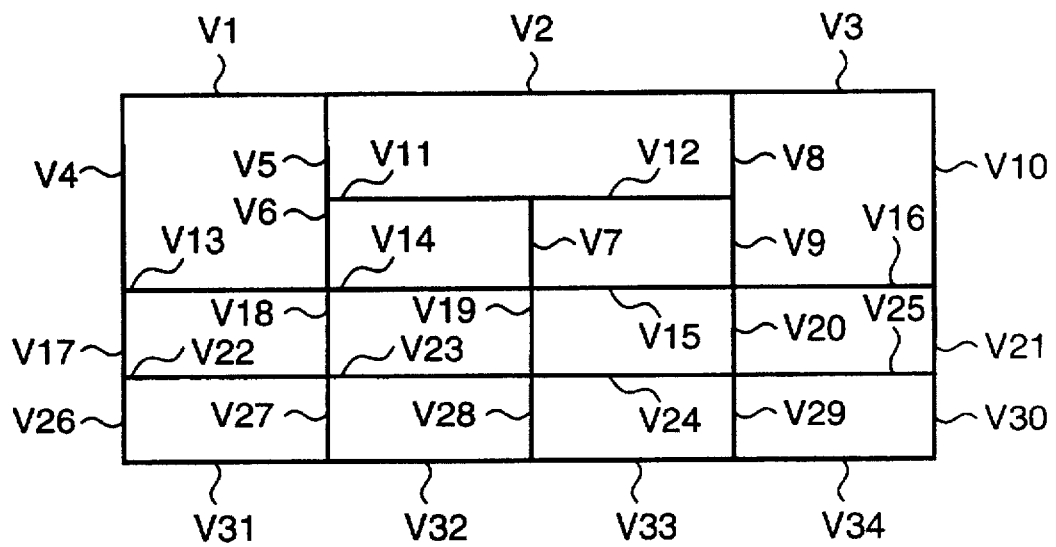
FIGS. 24a–b are a set of views showing how a rectangular frame component table of the third embodiment is applied.

In case any one of the above ruled lines is not detected, all the data entries made so far for the k-th rectangular frame in the rectangular frame component table 241 are discarded. The table is then reset so that a rectangular frame composed of other vectors may be entered therein. FIG. 24(B) portrays the rectangular frame component table 241 obtained when the above steps are applied to the table of FIG. 24(A).

The component frame extracting part 214 examines the inclusive relations between the character blocks obtained by the character block extracting part 212 and the rectangular frames acquired by the rectangular frame extracting part 213, and extracts as table components rectangular frames each containing only one or no character block at all.

Figure 25:
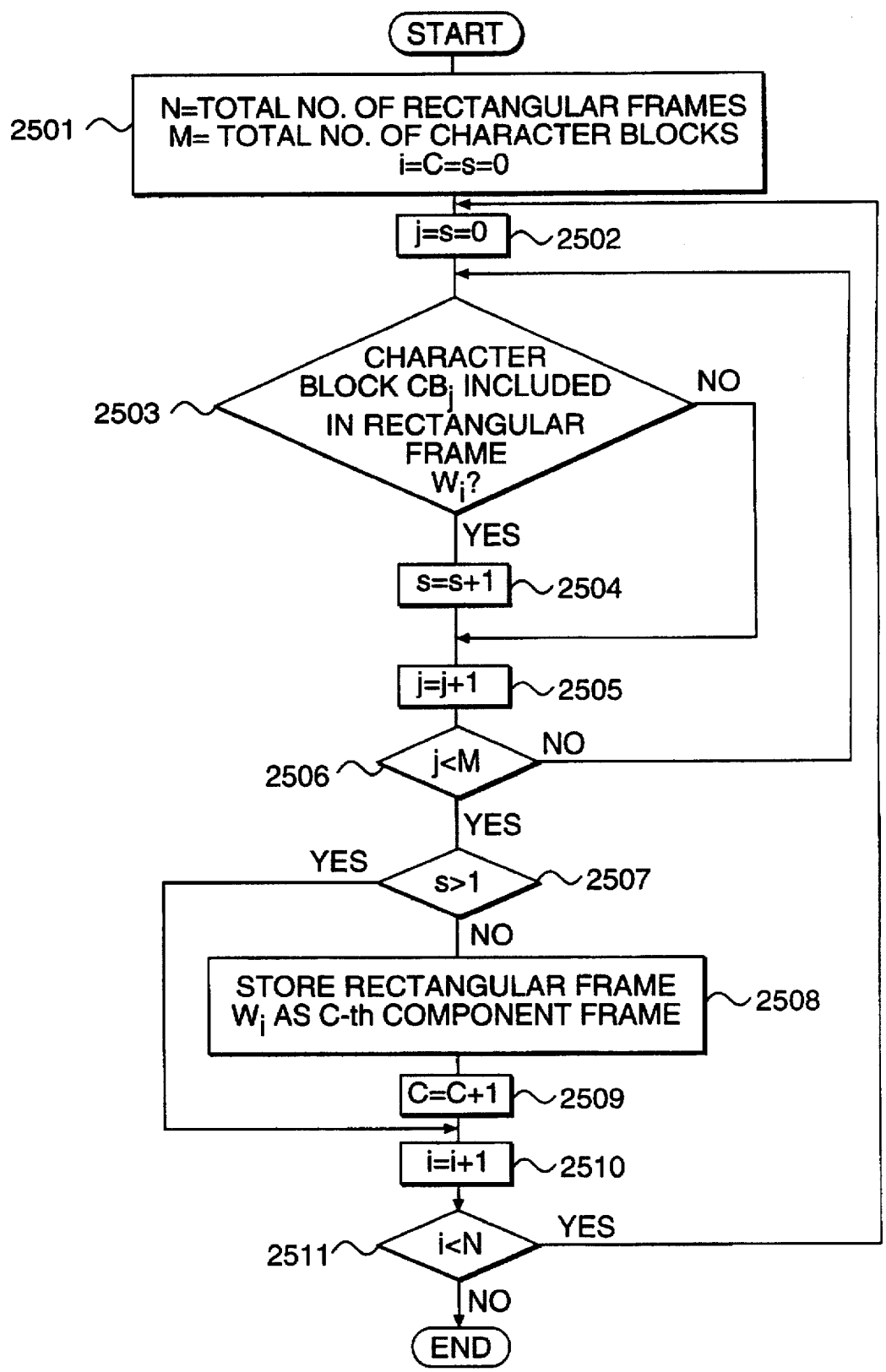
FIG. 25 is a flowchart of steps in which a component frame extracting part of the third embodiment works.
Figures 26A, 26B:
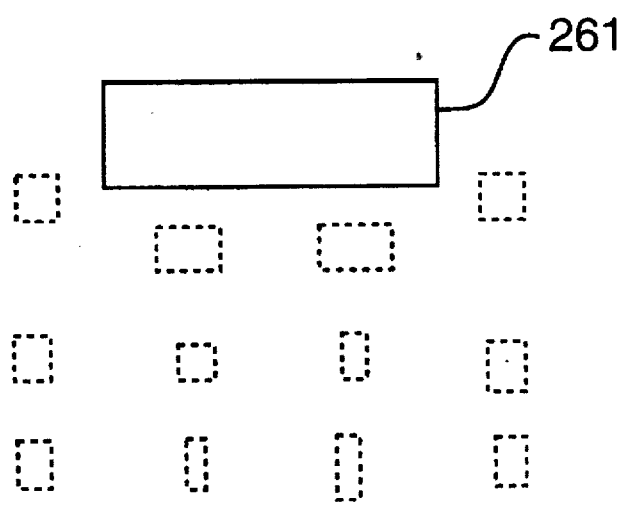
FIGS. 26a–b are a set of views depicting how a component frame is extracted by the component frame extracting part.

FIG. 25 is a flowchart of steps in which the component frame extracting part 214 works. The inclusive relations between each rectangular frame and the character blocks are first examined (step 2503), and then the number of character blocks included in the rectangular frame is counted (step 2504). If the rectangular frame is found to include a plurality of character blocks, that rectangular frame is discarded because the character blocks therein govern the structure of rows and columns. If the rectangular frame includes only one character block or has no character block, that rectangular frame is stored as a component frame (steps 2507 and 2508). FIG. 26(B) shows results of the extracting process carried out by the component frame extracting part 214 on the table of FIG. 26(A).

The character block extending part 215 takes as its input the ruled line image obtained by the character/ruled line separating part 211, the component frames acquired by the component frame extracting part 214, and the character blocks outside the component frames. Given the input, the character block extending part 215 causes the first character block extending part 2151 and the second character block extending part 2152 to extend the character blocks so that the block edges are aligned. The first and the second character block extending parts 2151 and 2152 are the same as those of the first and the second embodiments and thus will be omitted from the description hereunder.

Figure 27A:
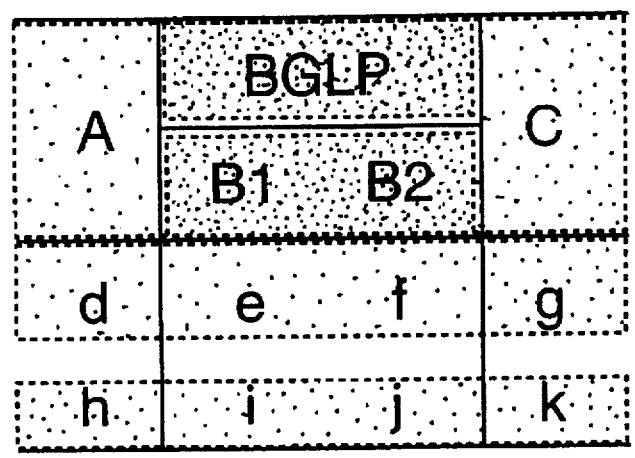
FIGS. 27a–b are a set of views illustrating how rows and columns of a table are extracted by the third embodiment.
Figure 27B:
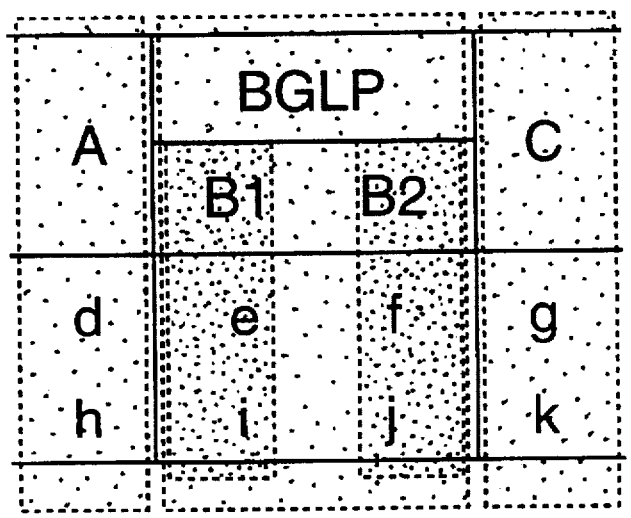

The row extracting part 216 and the column extracting part 217 operate in the same manner as their counterparts of the first embodiment, except that the former take character blocks and component frames as their input. Illustratively, the third embodiment extracts a structure of rows and columns from the table of FIG. 26(A) to produce the results shown in FIGS. 27(A) and 27(B). As described, the third embodiment of the invention is capable of accurately extracting structures of rows and columns from various tables of complicated constitutions.

[Fourth Embodiment]

Figure 28:
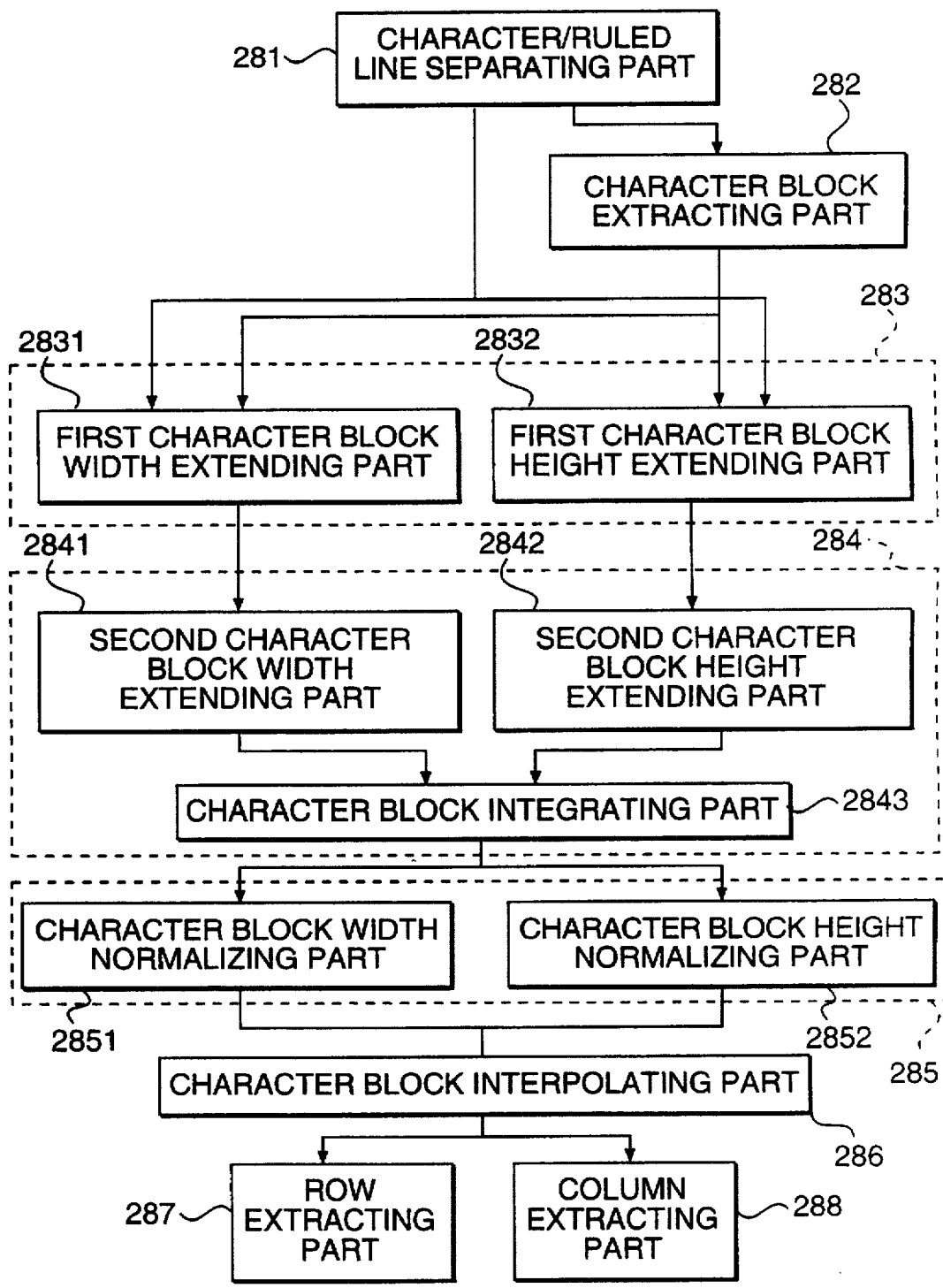
FIG. 28 is a view outlining how a fourth embodiment of the invention is constituted.

FIG. 28 outlines how the fourth embodiment of the invention is constituted. The fourth embodiment comprises a character/ruled line separating part 281, a character block extracting part 282, a first character block extending part 283, a second character block extending part 284, a character block normalizing part 285, a character block interpolating part 286, a row extracting part 287 and a column extracting part 288. The first character block extending part 283 is composed of a first character block width extending part 2831 and a first character block height extending part 2832. The second character block extending part 284 is made of a second character block width extending part 2841, a second character block height extending part 2842 and a character block integrating part 2843. The character block normalizing part 285 is constituted by a character block width normalizing part 2851 and a character block height normalizing part 2852.

The character/ruled line separating part 281 separates characters from ruled lines in the table image. From the character image obtained by the character/ruled line separating part 281, the character block extracting part 282 extracts a rectangular area containing one group of black picture elements and assumes the area to be a single character. The character block extracting part 281 then integrates into a character block one character or more that are close to one another by judging from the distance therebetween. These functions are the same as those of the first embodiment and thus will not be elaborated further hereunder.

The first character block extending part 283 then takes as its input the ruled line image separated by the character/ruled line separating part 281 and the character blocks extracted by the character block extracting part 282, and extends the character blocks in size by use of the ruled lines. As mentioned, the first character block extending part 283 includes two subordinate parts: first character block height extending part 2832 for extending character blocks vertically, and first character block width extending part 2831 for horizontal extension of character blocks.

Figure 29:
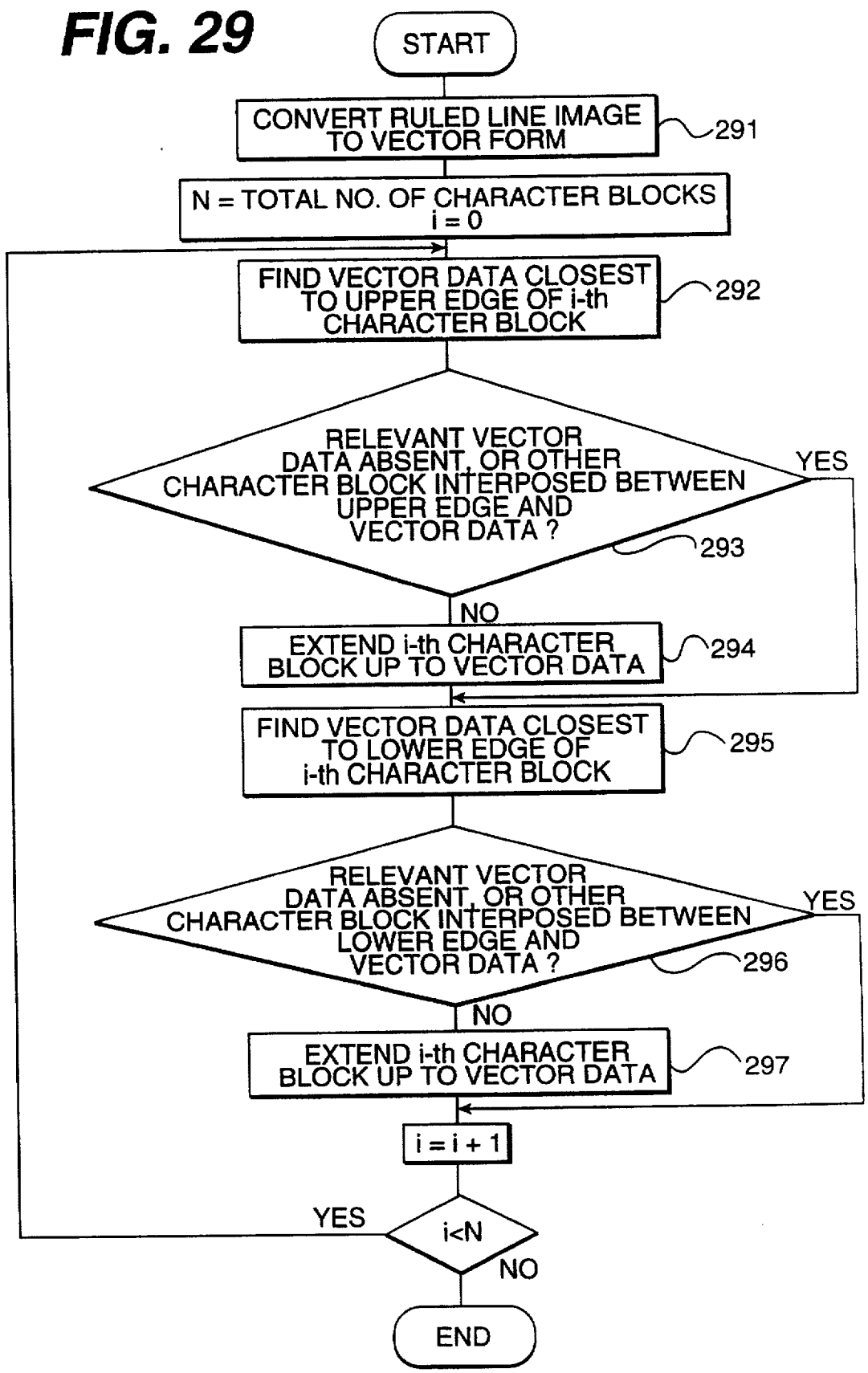
FIG. 29 is a flowchart of steps in which a first character block height extending part of the fourth embodiment extends character blocks vertically.

Described below with reference to FIG. 29 is the algorithm used by the first character block height extending part 2832 to extend character blocks vertically. The ruled line image is first converted to vector form (step 291). The process of turning ruled lines into vectors may comprise known techniques such as those disclosed in Japanese Patent Laid-Open No. HEI/1-142880 or HEI/2-105265. Then the distances between each character block and the vector data are obtained, and the data on the vectors that are closest to the upper and lower side edges of the current character block are acquired. If no other character block exists between the vectors thus obtained and the current character block, then that block may be extended up to these vectors (steps 292-297). If possible, the character block is extended in a way that makes the end points of the vector data coincide with the corners of the character block. The steps above are carried out on all character blocks.

Figure 30:
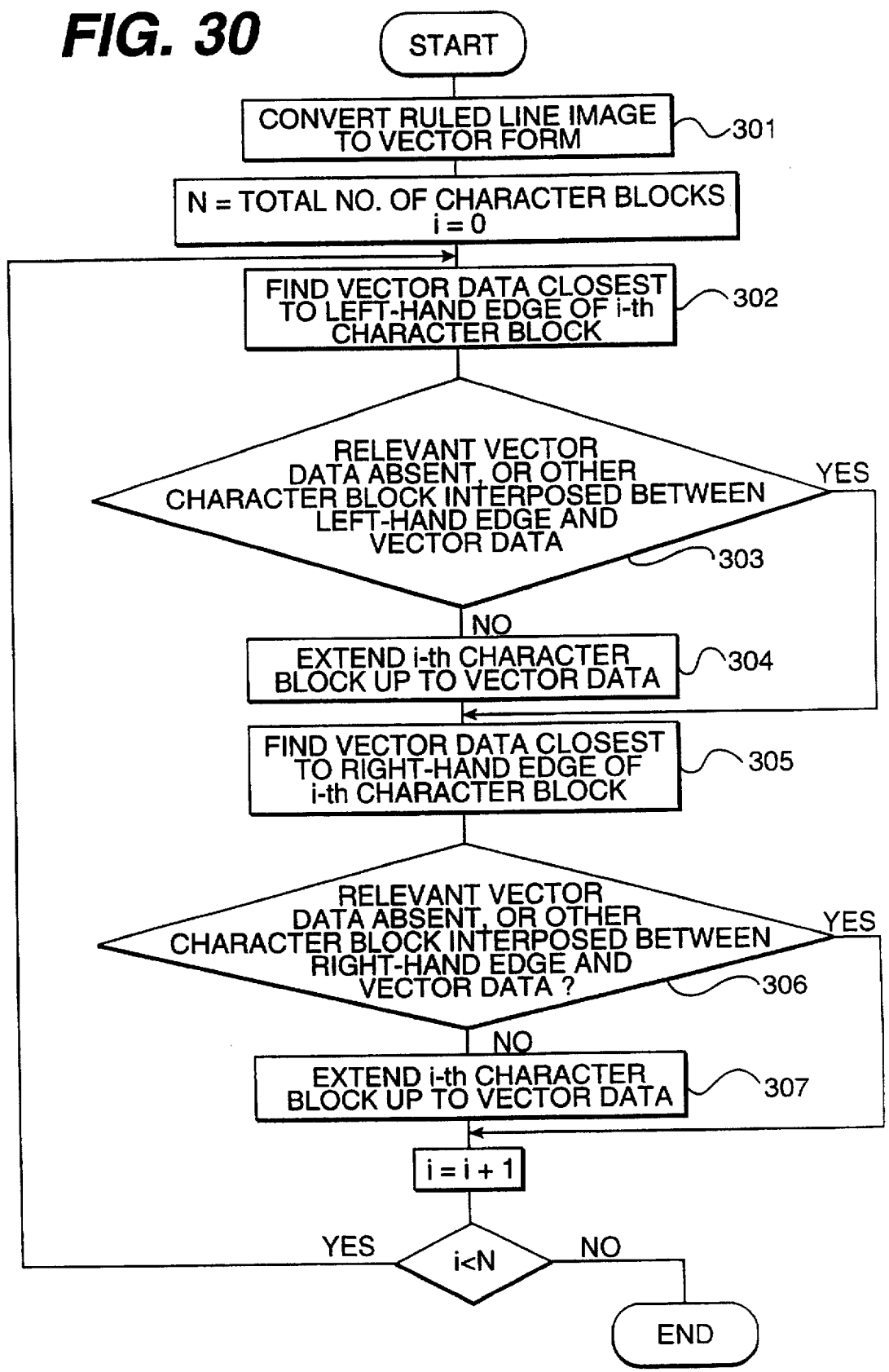
FIG. 30 is a flowchart of steps in which a first character block width extending part of the fourth embodiment extends character blocks horizontally.

FIG. 30 depicts the algorithm used by the first character block width extending part 2831 to extend character blocks horizontally. The algorithm is the same as that of FIG. 29 except that the upward and downward directions for the latter are replaced by the leftward and rightward directions for the former, respectively.

Figures 19A, 19B:
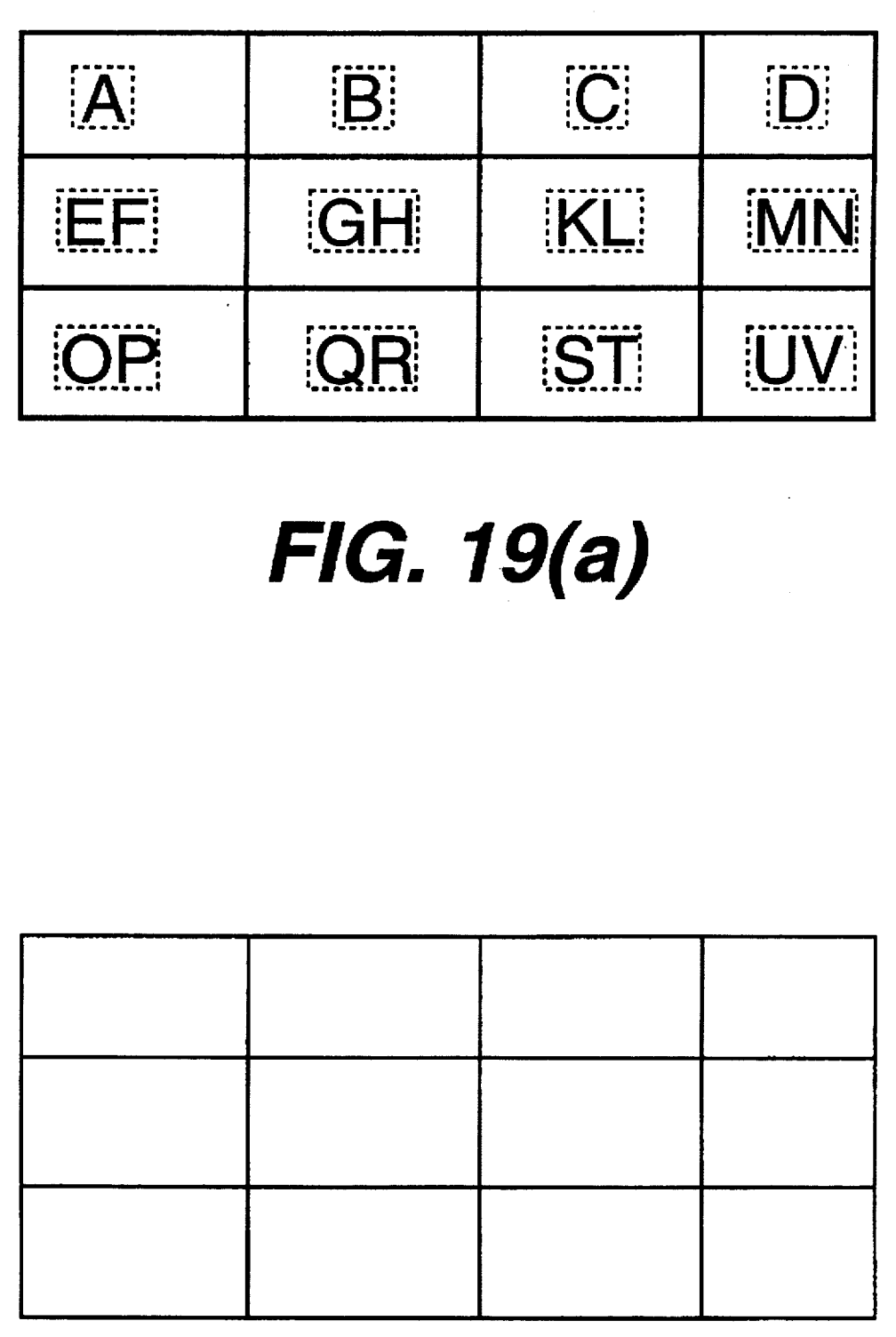

FIG. 18(A) shows results of the process performed by the first character block extending part 283 on the table of FIG. 6(A). FIG. 19(B) illustrates results of the process carried out by the first character block extending part 283 on a table with all ruled lines furnished intact such as that shown in FIG. 19(A). As can be seen in FIGS. 19(A) and 19(B), when the table has no missing ruled lines, the character blocks obtained by the first character block extending part 283 coincide with the rectangles formed by the ruled lines.

The second character block extending part 284 examines the distribution of character blocks in the horizontal and vertical directions of each character block, and extends the latter block so that the block edges are aligned. The second character block extending part 284 includes the second character block width extending part 2841, second character block height extending part 2842 and character block integrating part 2843. How these component parts work will be described below.

Figure 31:
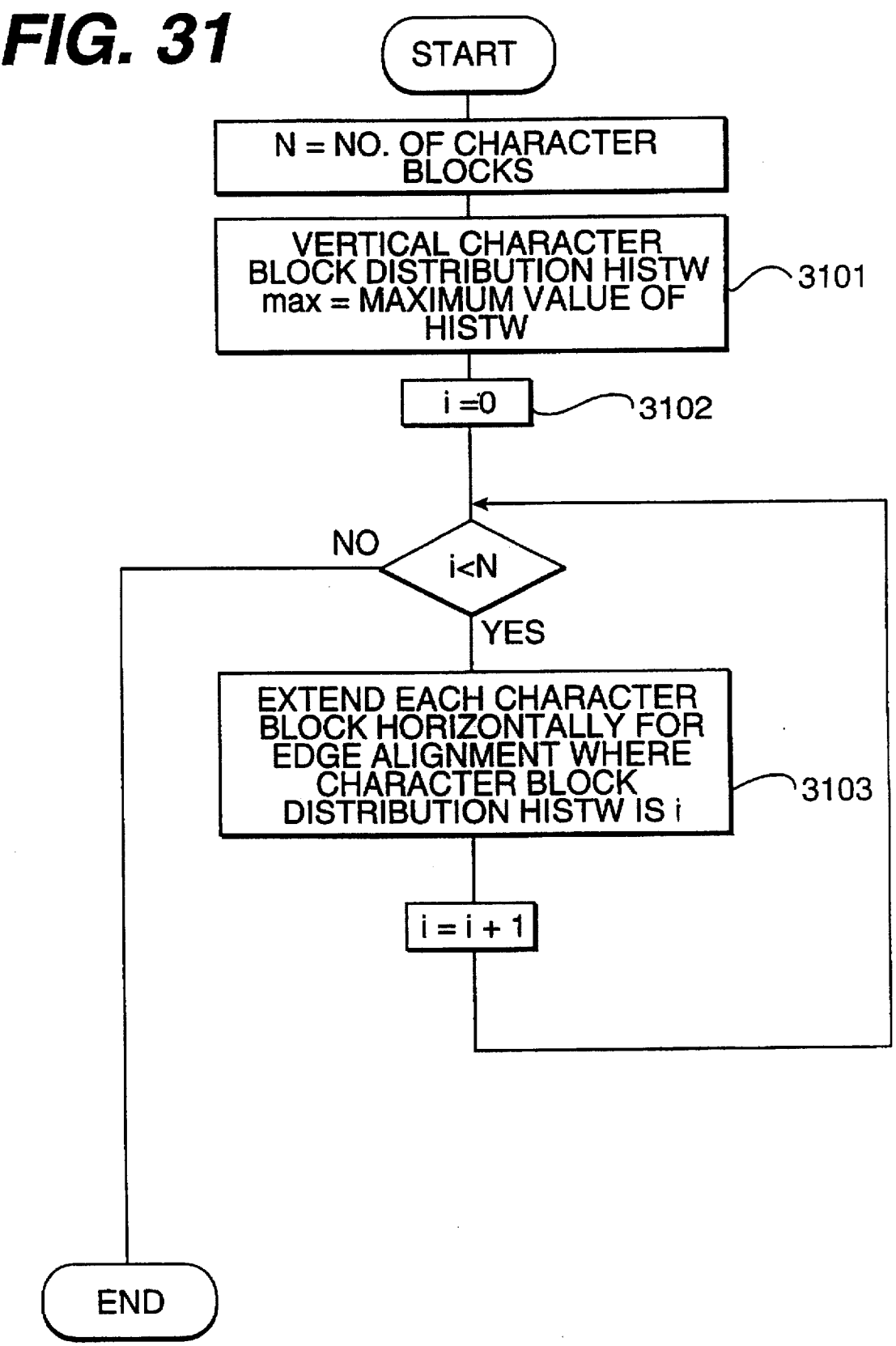
FIG. 31 is a flowchart of steps in which a second character block height extending part of the fourth embodiment works.

How the second character block width extending part 2841 and the second character block height extending part 2842 work will now be described with reference to the flowcharts of FIGS. 31 and 32. The processes are carried out in parallel.

Figure 33:
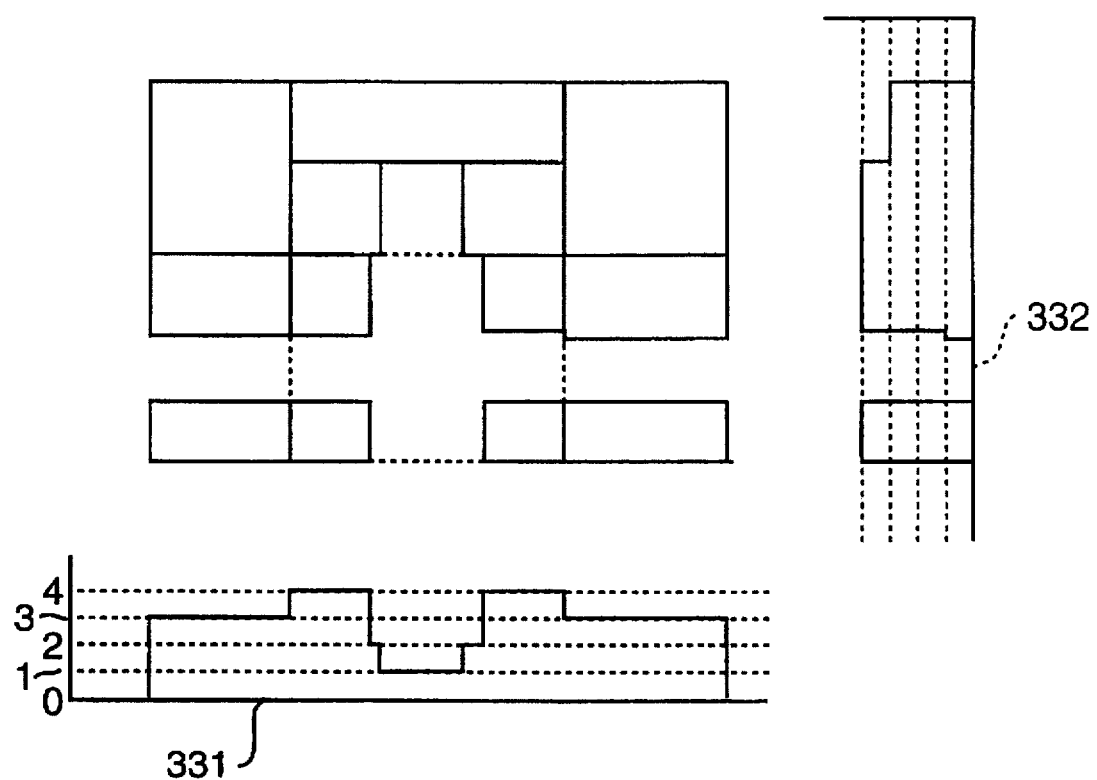
FIG. 33 is a view showing vertical and horizontal character block distributions derived from the table of FIG. 6(A)

In step 3101, the second character block width extending part 2841 creates a vertical character block distribution indicating how many character blocks overlap with one another in which coordinates. FIG. 33 shows a vertical character block distribution 331 corresponding to the table of FIG. 6(A). FIG. 33 also includes a horizontal character block distribution 332 corresponding to the same table. It is assumed that by this time, the results of the operation by the first character block extending part 283 have been processed.

In step 3102, the variable i is reset to 0. In step 3103, portions are found wherein the value of the vertical character block distribution HistW is changed to i, i.e., to 0, or wherein the value is changed from 0 to something greater than 0, so that each character block is extended in terms of width without overlapping with other character blocks. At this point, the extending process must be pursuant to the following two rules:

Rule 1: Extend from left to right if the value is changed to i.

Rule 2: Extend from right to left if the value is changed from i to something greater than i.

The extending process as constrained above is repeated while i<N. FIG. 34(A) indicates how character blocks look like when their widths have been extended.

Figure 32:
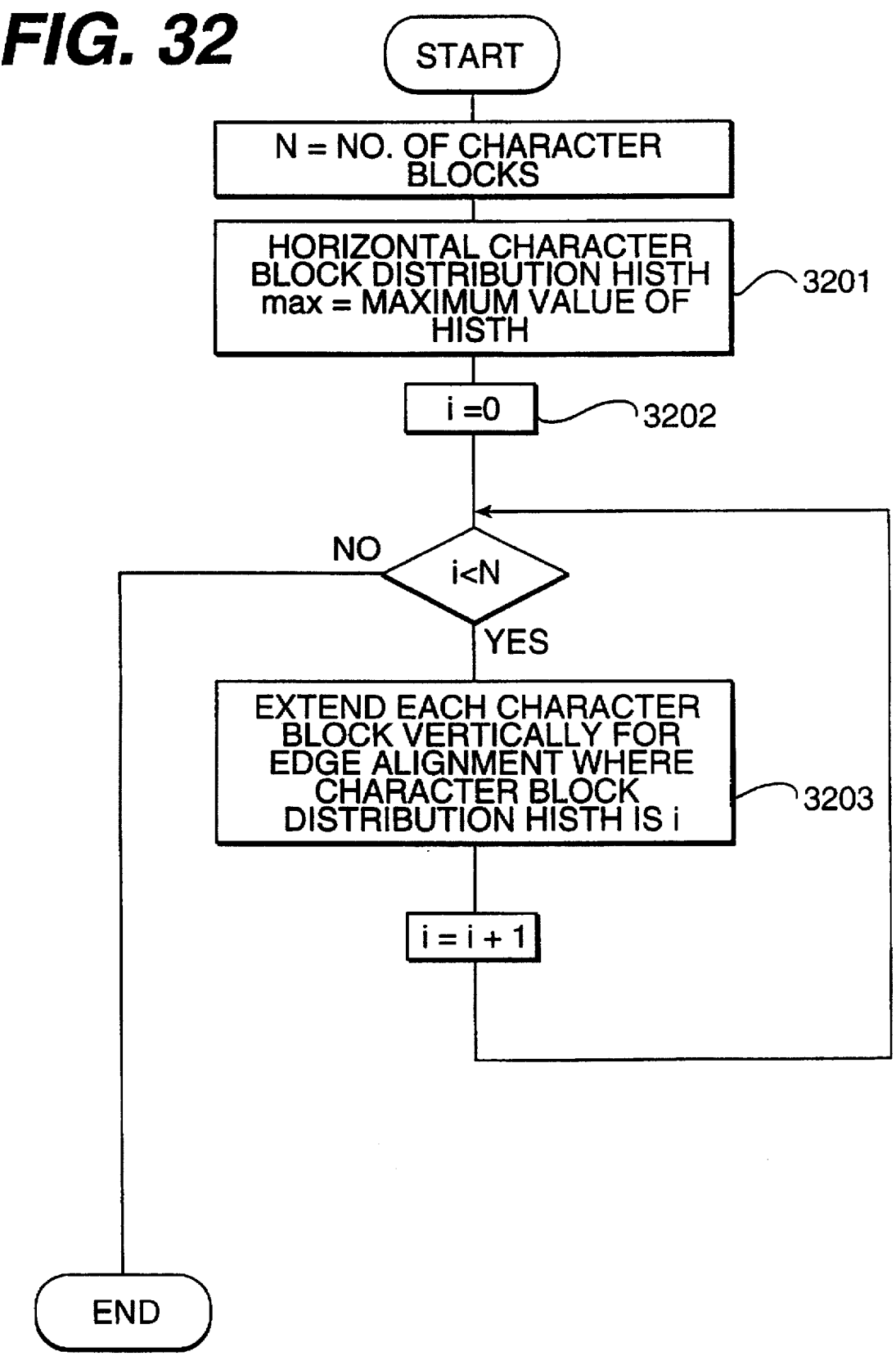
FIG. 32 is a flowchart of steps in which a second character block width extending part of the fourth embodiment works.

In steps 3201 through 3203 of FIG. 32, the second character block height extending part 2842 generates a horizontal character block distribution, and extends the heights of the character blocks involved in the same manner as in block height extension. The rules on the extension in step 3203 are:

Rule 1: Extend downward when the value is changed to i.

Rule 2: Extend upward when the value is changed from i to something greater than i.

FIG. 34(B) portrays how the character blocks look like when the block height extension has been completed.

Figure 35:
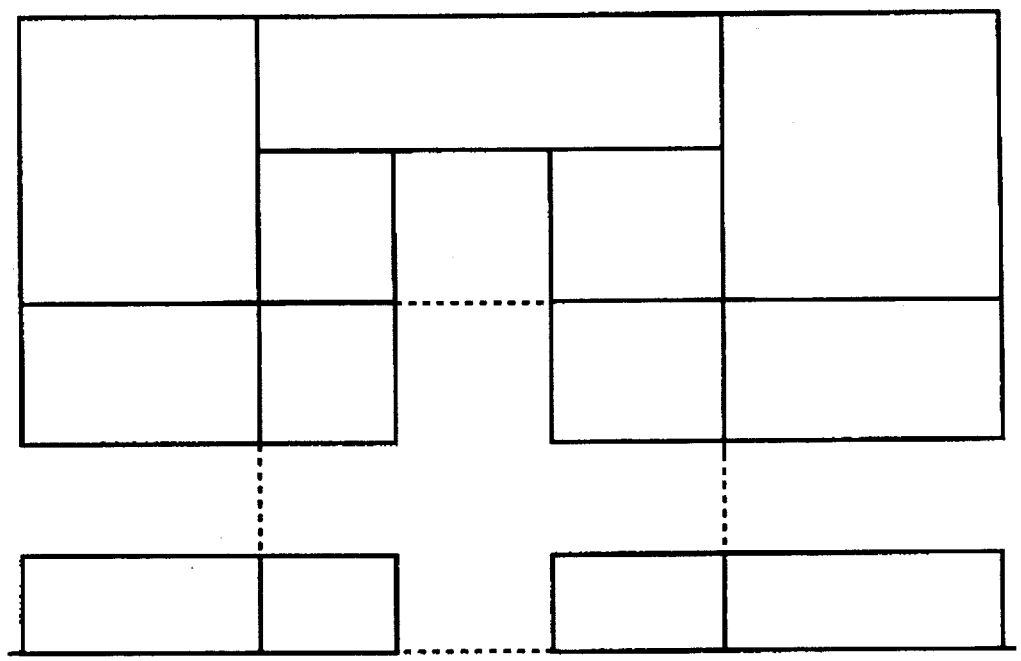
FIG. 35 is a view illustrating how a character block integrating part of the fourth embodiment integrates character blocks.
Figure 36A:
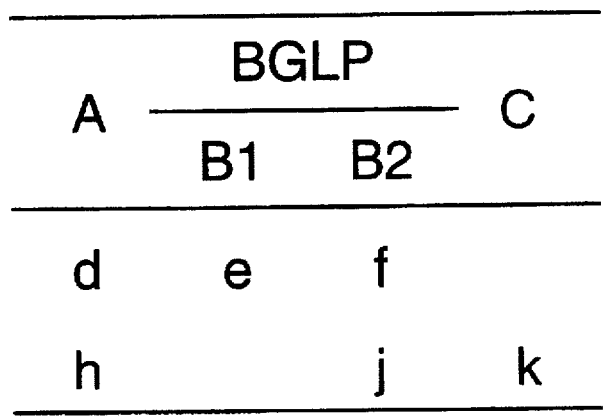
FIG. 36(A) is a view of a table with omissions in its contents.
Figure 36B:
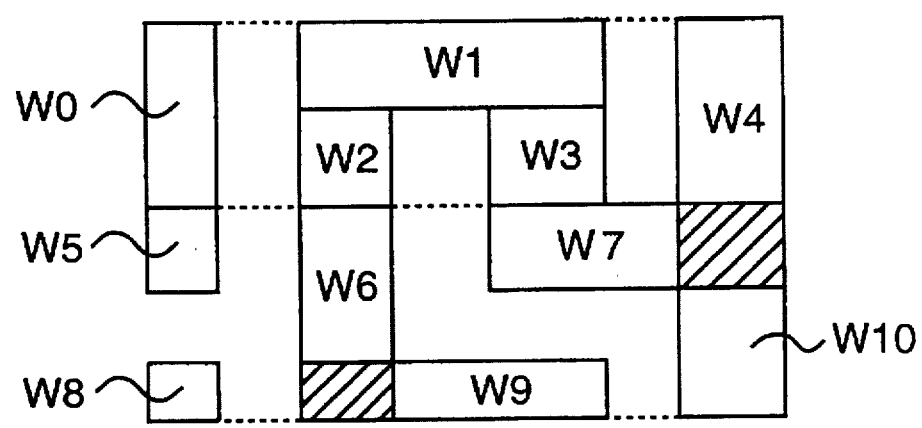
FIG. 36(B) is a view showing how the table of FIG. 36(A) is integrated by the character block integrating part.

The character block integrating part 2843 takes as its input the results of extension done by the second character block width extending part 2841 and second character block height extending part 2842, and matches the resulting blocks in terms of width and height so as eventually to acquire character blocks whose edges are aligned. Specifically, the character block integrating part 2843 modifies both the width of each character block using the results from the second character block width extending part 2841 and the character block height using the results from the second character block height extending part 2842. FIG. 35 illustrates typical results of character block integration performed on the table of FIG. 6(A). FIG. 36 shows results of the processing performed by the second character block extending part 284 on a table with partially missing contents. As indicated in FIG. 36(B), character blocks overlap where contents are missing (shown shaded).

Figure 37:
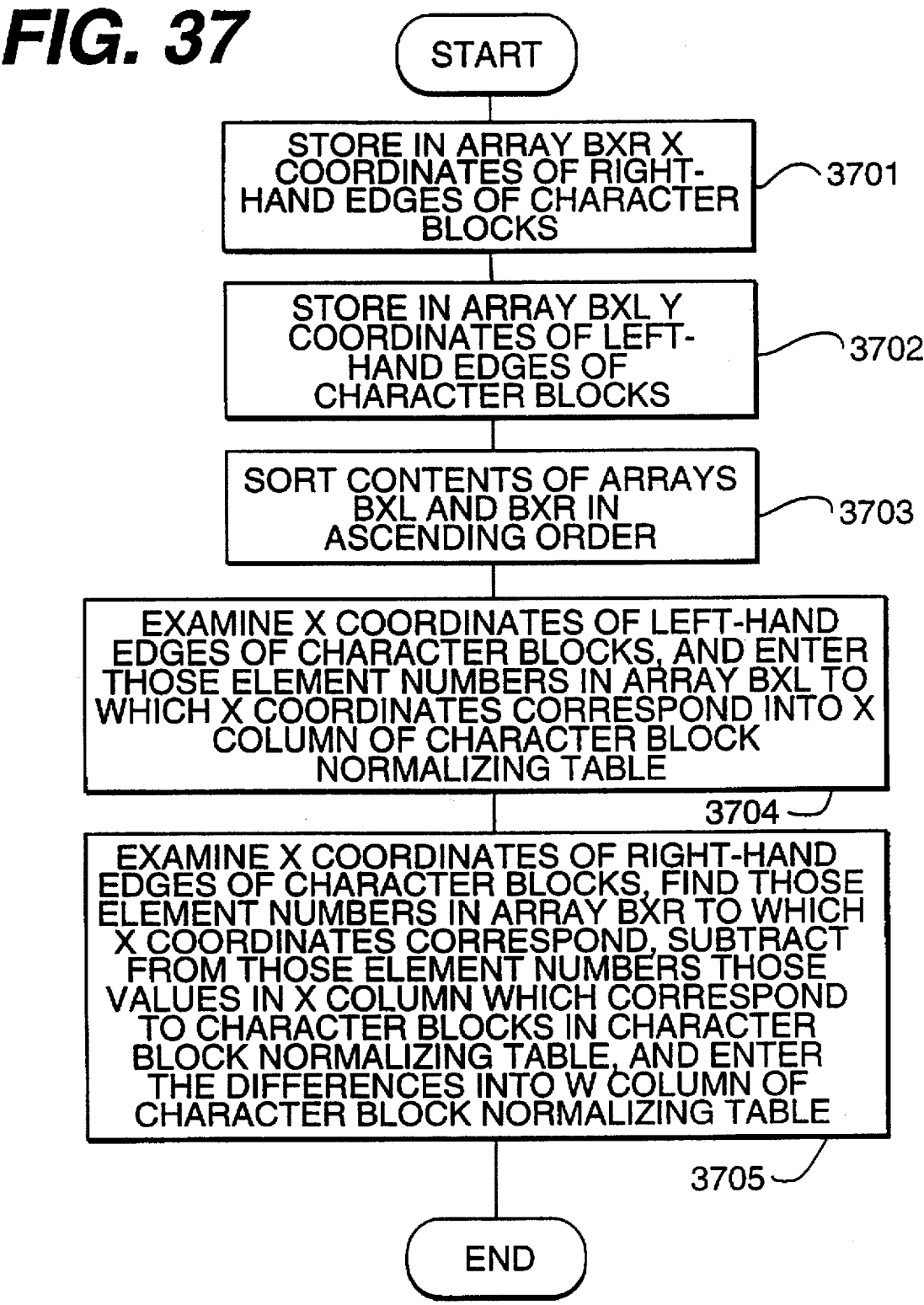
FIG. 37 is a flowchart of steps in which a character block normalizing part of the fourth embodiment works.

The character block normalizing part 285 takes extended character blocks from the second character block extending part 284, and normalizes all character blocks in position, width and height by use of the position data about the upper, lower, left-hand and right-hand side border lines constituting each of the blocks. As shown in FIG. 28, the process is carried out jointly by the character block width normalizing part 2851 and character block height normalizing part 2852. How the character block width normalizing part 2851 works will now be described with reference to FIG. 37.

First, all rectangular frames are examined, and the X coordinates of their left-hand side edges are obtained and stored in an array BXR (step 3701). At this point, overlapping X coordinates are not stored in the array BXR. The X coordinates of the right-hand side edges are likewise acquired and placed in an array BXL (step 3702). The first element BXR[1] of the array BXR is loaded with a value of −1 for distinction from other coordinate values; the actual coordinates are stored from the second element BXR[2] onward in the array BXR. The contents of the arrays BXL and BXR are then sorted in ascending order (step 3703).

The X coordinates of the left-hand side edges of all character blocks are again examined, and those element numbers in the array BXL to which the coordinates correspond (i.e., suffixes of the arrays) are entered into the "X" column of a character block normalizing table 381 in FIG. 38 (step 3704). For example, in FIG. 36, the left-hand side coordinate of a frame No. W1 corresponds to the second element in the array BXL. Thus a value "2" is entered into the "X" column for the frame No. W1 in the character block normalizing table 381.

Next, the X coordinates of the right-hand side edges of all character blocks are examined, and those element numbers in the array BXR to which the coordinates correspond are acquired. From those element numbers are subtracted the values already entered in the "X" column for the respective frames in the character block normalizing table 381. The differences are entered into the "W" (width) column of the character block normalizing table 381 (step 3705). For example, in FIG. 36, the right-hand side coordinate of a frame No. W1 corresponds to the third element in the array BXR. Thus a value "2" is entered into the "W" column for the frame No. W1 in the character block normalizing table 381. The character block height normalizing pat 2852 performs on Y coordinates what the character block width normalizing part 2851 carries out on X coordinates. FIG. 38 illustrates the character block normalizing table 381 derived from the table of FIG. 36.

Figure 39:
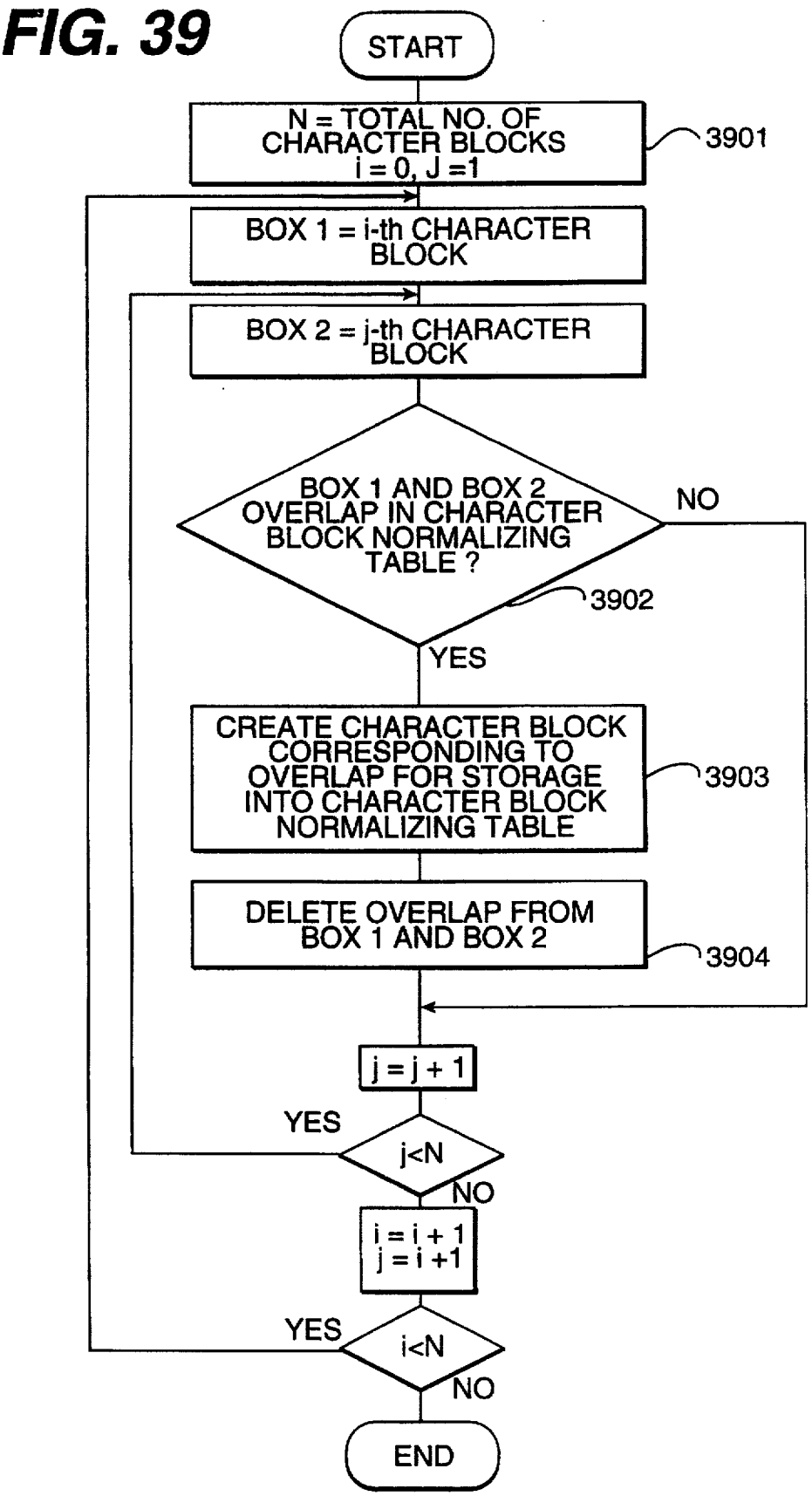
FIG. 39 is a flowchart of steps in which a character block interpolating part of the fourth embodiment works.

The character block interpolating part 286 checks character blocks for overlaps based on the character block normalizing table 381 obtained by the character block normalizing part 285. How the character block interpolating part 286 works will now be described with reference to the flowchart of FIG. 39.

Figures 40A, 40B:
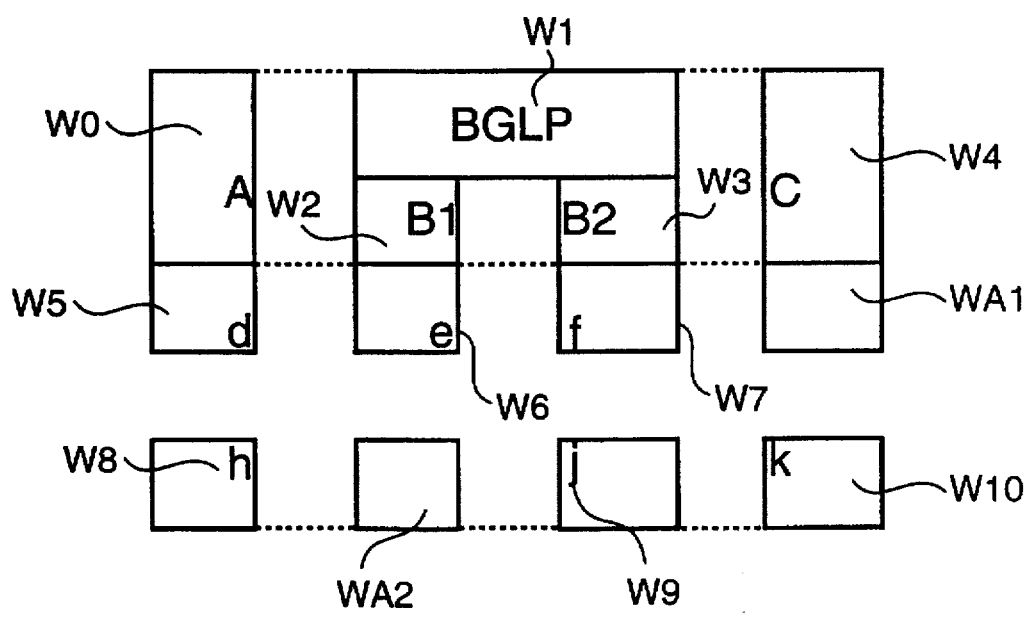
FIG. 40(A) is a view illustrating a character block normalizing table produced by the processing of the character block interpolating part.
FIG. 40(B) is a view portraying typical results of the process performed by the character block interpolating part.

First, initial values 0 and 1 are set to variables i and j, respectively (step 3901). The i-th character block is compared with the j-th character block. A check is made on the character block normalizing table 381 to see if there exists any overlapping portion between the two blocks (step 3902). If any overlapping portion is detected, a virtual character block corresponding to that portion is entered into the character block normalizing part 381 (step 3903). Then the overlapping portion is deleted from the i-th and the j-th character blocks, and the coordinates of the blocks are modified accordingly in the character block normalizing table 381 (step 3904). The steps above are carried out on all character blocks. After undergoing the above process, the character block normalizing table 381 turns out to be as shown in FIG. 40(A). The table of FIG. 40(A) is translated into an actual table of FIG. 40(B). In this manner, virtual character blocks are created to interpolate the table with partially missing contents.

The row extracting part 287 and column extracting part 288 extract a structure of rows and columns by examining the positional relations between the character blocks that are normalized by the character block normalizing part 285 and interpolated by the character block interpolating part 286. As can be seen in the character block normalizing table 381, all character blocks are represented by two-dimensional coordinates that are uniquely determined. Thus it is possible to extract each row and column accurately by examining the values in the character block normalizing table 381. For example, character blocks having a value 3 in the "Y" column of the character block normalizing table 381 are considered to form one row.

Figure 41:
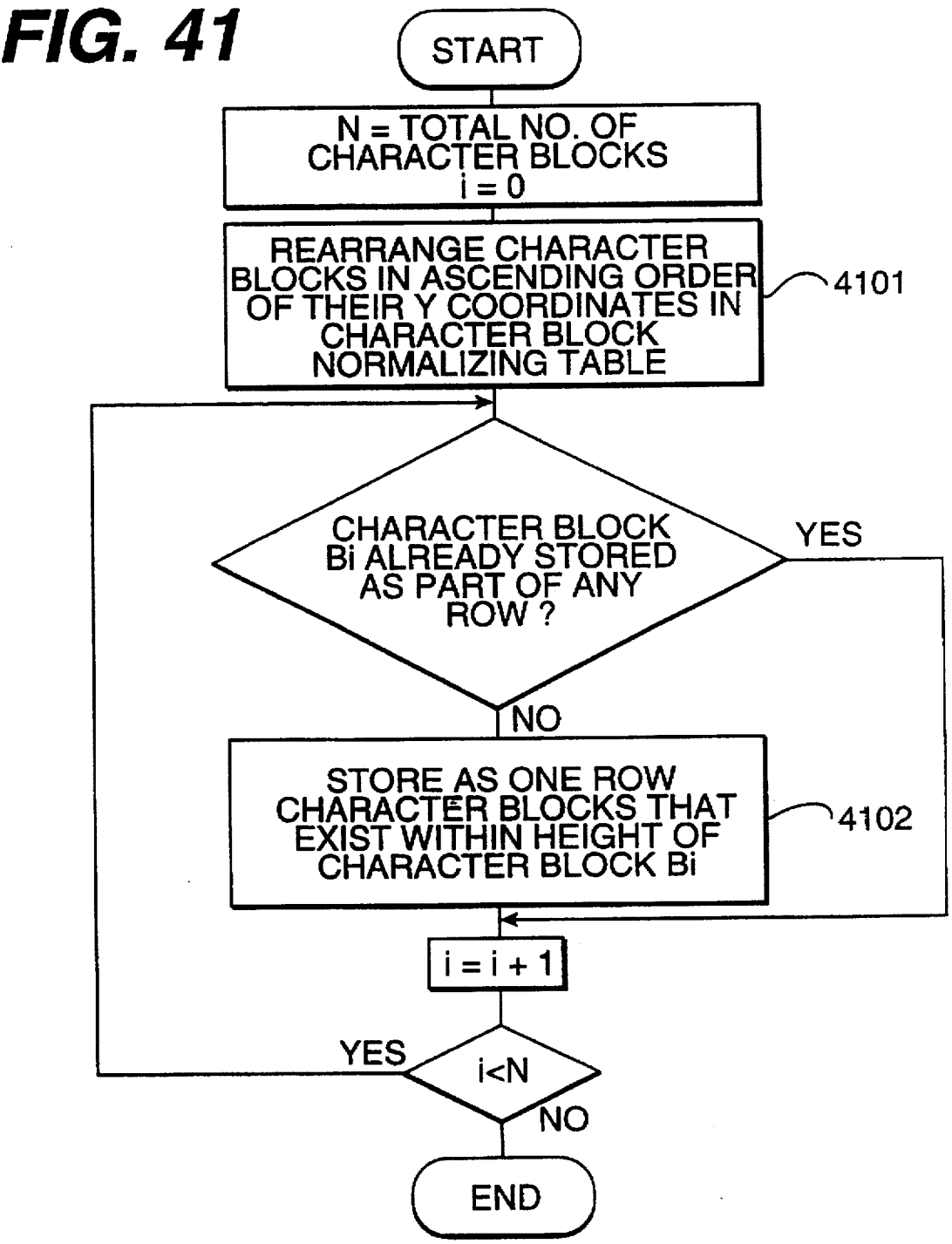
FIG. 41 is a flowchart of steps in which a row extracting part of the fourth embodiment works.
Figure 42:
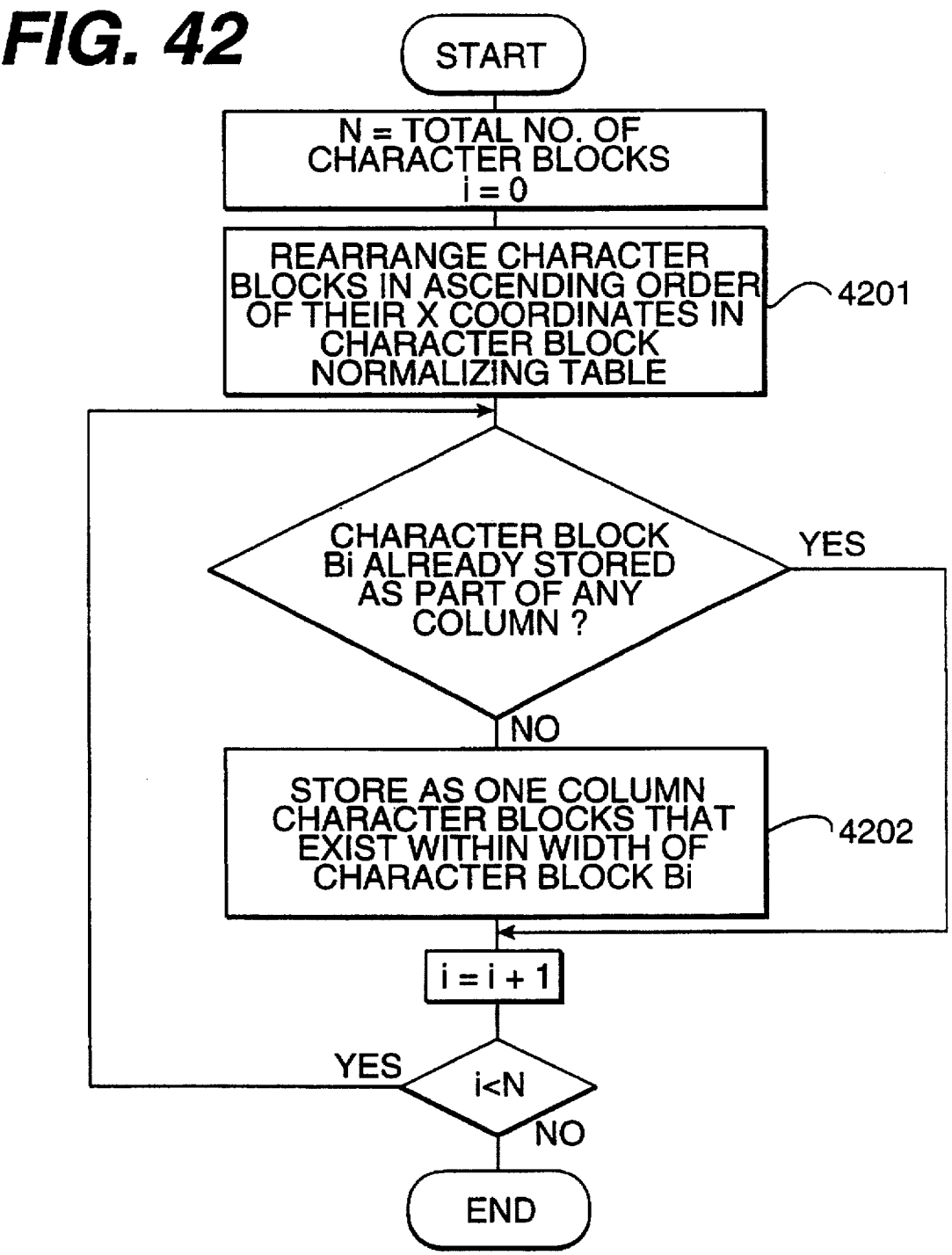
FIG. 42 is a flowchart of steps in which a column extracting part of the fourth embodiment works.

FIG. 41 is a flowchart of steps in which the row extracting part 287 works, and FIG. 42 is a flowchart of steps in which the column extracting part 288 operates. The row extracting part 287 first rearranges the character blocks in the ascending order of their Y coordinates entered in the character block normalizing table 381 (step 4101). Then the i-th character block Bi is taken (i is initially reset to 0). Of the character blocks not yet stored as rows, those that exist within the vertical range in which the character block Bi is located (i.e., the character blocks that exist within a height H above the Y coordinate of the character block Bi in the character block normalizing table 381) are considered to form a row and are stored as such (step 4102). This process is repeated until the yet-to-be-stored character blocks have been exhausted.

Likewise, the column extracting part 288 rearranges the character blocks in the ascending order of their X coordinates entered in the character block normalizing table 381 (step 4201). Then the i-th character block Bi is taken (i is initially reset to 0). Of the character blocks not yet stored as columns, those that exist within the horizontal range in which the character block Bi is located (i.e., the character blocks that exist within a width W extended from the X coordinate in the character block normalizing table 381) are considered to form a column and are stored as such (step 4202). This process is repeated until the yet-to-be-stored character blocks have been exhausted.

Figure 43A:
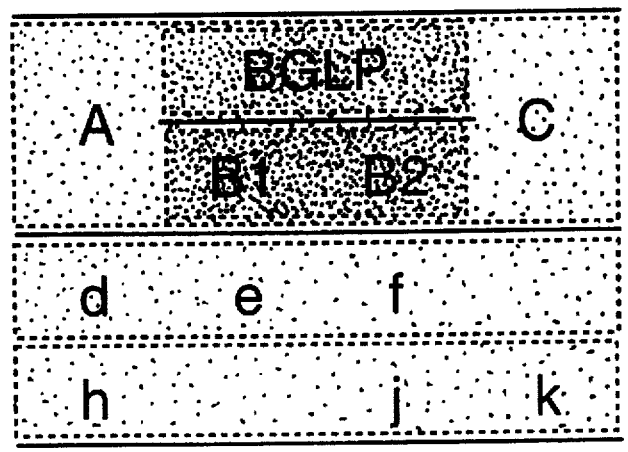
FIG. 43(A) is a view showing typical results of row extraction by the row extracting part.
Figure 43B:
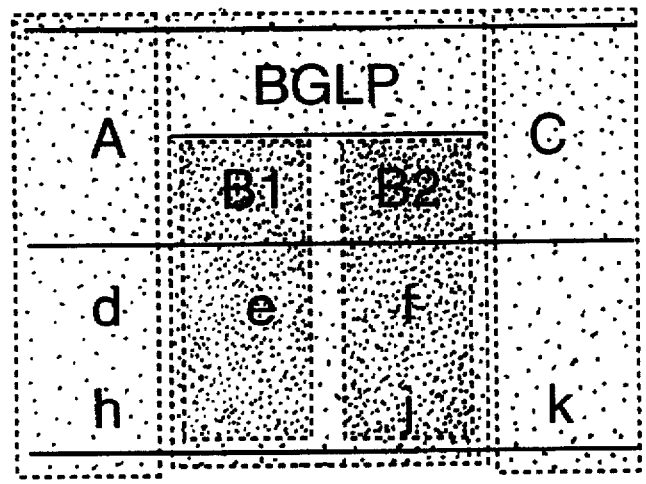
FIG. 43(B) is a view depicting typical results of column extraction by the column extracting part.

If any row or column is divided, each row and column is subjected to repeated row and column extraction until all segmented rows and columns have been extracted. FIG. 43(A) portrays results of the row extracting operation performed on the table of FIG. 36(A), and FIG. 43(B) illustrates results of the column extracting operation carried out on the same table. As described, when the character blocks are extended to have their edges aligned and are normalized in terms of position and size by the fourth embodiment, the structure of the rows and columns constituting the target table with partially missing contents is extracted accurately.

FIG. 44 is a set of views showing how a table is recognized illustratively by the second embodiment of the invention. FIG. 44(A) is a view of an original table with its vertical ruled lines missing, like the table in FIG. 2(E). FIG. 44(B) is a view of the table obtained as a result of the processing carried out on the original of FIG. 44(A). The table of FIG. 44(B) shows that each of the rectangles constituting the original table is properly recognized. The characters are read by known character recognition techniques. As illustrated, the table contains some errors stemming from character recognition.

As described, the first embodiment of the invention recognizes the target table by extending its component character blocks suitably and by filling the gaps between these blocks. This makes it possible to recognize a table of which a considerable portion of the ruled lines are missing or of which the gaps between the character blocks are appreciably large.

The second embodiment of the invention extracts the structure of the target table more accurately by use of ruled line data in extending the character blocks constituting the table. For example, the embodiment addresses a table with its character blocks existing across a plurality of segmented columns (as with headings of segmented columns; see FIG. 20(A)), and still obtains the table structure with accuracy (as in FIG. 20(C)).

The third embodiment of the invention grasps the structure of the target table by utilizing the rectangles formed by the ruled lines thereof. The embodiment allows the structure of complicated tables to be extracted with precision.

The fourth embodiment of the invention extends the character blocks so as to align their edges and normalizes the extended character blocks in position and size. The embodiment makes it possible to extract the structure of rows and columns accurately from the target table with its contents partly missing.

Where preferred embodiments of the invention have been described using specific terms, such description is for illustrative purposes only, and it is to be understood that changes and variations may be made without departing from the spirit or scope of the following claims.

What is claimed is:

1. A table recognition apparatus for recognizing a table image having both a character image and a ruled line image, said table recognition apparatus comprising:

image separating means for separating characters from ruled lines in said table image;

means for acquiring a rectangular area containing a character in the character image;

means for producing a threshold from the dimensions of said acquired rectangular area;

character block extracting means for using said threshold to extract character blocks from the character image separated by said image separating means;

first character block extending means for extending each of said character blocks up to the nearest one of the ruled lines;

means for computing a horizontal and a vertical distribution of character blocks to keep each extended character block from overlapping with other ones of the character blocks;

second character block extending means for further extending the extended character blocks to align the edges of the extended character blocks;

row extracting means for extracting rows of said table image based on the distance between the extended character blocks; and column extracting means for extracting columns of said table image based on the distance between the extended character blocks.

2. A table recognition apparatus for recognizing a table image having both a character image and a ruled line image, said table recognition apparatus comprising:

image separating means for separating characters from ruled lines in said table image;

character block extracting means for extracting character blocks from the character image separated by said image separating means;

rectangular frame extracting means for extracting a rectangle composed of ruled lines, from the ruled line image separated by said image separating means;

means for converting the extracted ruled lines into a plurality of horizontal and vertical vectors;

means for comparing said horizontal and vertical vectors to a threshold angle;

component frame extracting means for extracting as a component frame a rectangular frame including at most one character block;

means for computing a horizontal and vertical distribution of character blocks first character block extending means for using said computed horizontal and vertical distribution of character blocks to extend a target character block up to the nearest one of the ruled lines;

second character block extending means for further extending the extended character blocks to align the edges of the extended character blocks;

row extracting means for extracting rows of said table image based on the distance between the extended character blocks; and column extracting means for extracting columns of said table image based on the distance between the extended character blocks.

3. A table recognition apparatus for recognizing a table image having both a character image and a ruled line image, said table recognition apparatus comprising:

image separating means for separating characters from ruled lines in said table image;

first character block extending means for extending each of said character blocks up to the nearest one of the ruled lines;

means for computing a horizontal and a vertical distribution of character blocks to keep each extended character block from overlapping with other ones of the character blocks;

second character block extending means for further extending the extended character blocks to align the edges of the extended character blocks;

character block normalizing means for normalizing each character block based on the distance between the extended character blocks;

character block interpolating means for detecting a virtual character block that overlaps the character blocks normalized by said character block normalizing means;

row extracting means for extracting rows based on the distance between the character blocks interpolated by said character block interpolating means; and column extracting means for extracting columns based on the distance between the character blocks interpolated by said character block interpolating means.

* * * * *

UNITED STATES PATENT AND TRADEMARK OFFICE
CERTIFICATE OF CORRECTION

PATENT NO. : 5,708,730
DATED : January 13, 1998
INVENTOR(S) : Katsuhiko ITONORI

It is certified that error appears in the above-identified patent and that said Letters Patent is hereby corrected as shown below:

Claim 2, Column 18, line 9, after "blocks", insert --;--.

Signed and Sealed this

Twenty-eighth Day of July, 1998

Attest:

BRUCE LEHMAN

*Attesting Officer*        *Commissioner of Patents and Trademarks*